US012580251B2

(12) United States Patent
Koga

(10) Patent No.: US 12,580,251 B2
(45) Date of Patent: Mar. 17, 2026

(54) BATTERY AND METHOD FOR MANUFACTURING THE SAME

(71) Applicant: Panasonic Intellectual Property Management Co., Ltd., Osaka (JP)

(72) Inventor: Eiichi Koga, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 562 days.

(21) Appl. No.: 18/150,668

(22) Filed: Jan. 5, 2023

(65) Prior Publication Data

US 2023/0141351 A1     May 11, 2023

Related U.S. Application Data

(63) Continuation of application No. PCT/JP2021/022958, filed on Jun. 16, 2021.

(30) Foreign Application Priority Data

Jul. 17, 2020     (JP) ................................. 2020-123211

(51) Int. Cl.
*H01M 50/124* (2021.01)
*H01M 10/0525* (2010.01)
*H01M 50/121* (2021.01)

(52) U.S. Cl.
CPC ..... *H01M 50/124* (2021.01); *H01M 10/0525* (2013.01); *H01M 50/121* (2021.01)

(58) Field of Classification Search
CPC ........... H01M 10/0562; H01M 50/124; H01M 50/1243; H01M 50/131; H01M 50/14
See application file for complete search history.

(56) References Cited

U.S. PATENT DOCUMENTS 9,793,522 B2 * 10/2017 Bhardwaj ............ H01M 50/119
10,069,171 B2 * 9/2018 Kodama ........... H01M 10/0585
2018/0205119 A1 7/2018 Kodama
2018/0212210 A1 7/2018 Suzuki
(Continued)

FOREIGN PATENT DOCUMENTS

JP          57-172662 A     10/1982
JP          2004-039271      2/2004
(Continued)

OTHER PUBLICATIONS

Machine translation of JP 2018-013729 (no date) (Year: 0000).*
(Continued)

*Primary Examiner* — Amanda C. Walke
(74) *Attorney, Agent, or Firm* — Greenblum & Bernstein, P.L.C.

(57) ABSTRACT

A battery includes a power generating element and an insulating member. The power generating element has at least one battery cell including a positive electrode, a negative electrode, and a solid electrolyte layer, and the insulating member covers a side surface of the power generating element and having contact with the side surface. The insulating member has a wraparound portion continuously extending over an area from the side surface to a main surface of the power generating element and covering the side surface and the main surface and having contact with the side surface and the main surface.

20 Claims, 11 Drawing Sheets

(56)  References Cited

U.S. PATENT DOCUMENTS

| | | | | |
|---|---|---|---|---|
| 2019/0131603 A1 * | 5/2019 | Park | .................... | H01M 50/489 |
| 2019/0288248 A1 * | 9/2019 | Liu | .................... | H01M 50/124 |
| 2021/0043881 A1 * | 2/2021 | Wang | .................. | H01M 50/116 |
| 2021/0127471 A1 * | 4/2021 | Wang | .................... | H05B 47/11 |

FOREIGN PATENT DOCUMENTS

| | | | | |
|---|---|---|---|---|
| JP | 2012-221608 | 11/2012 | | |
| JP | 2018-116812 | 7/2018 | | |
| JP | 2020-013729 | 1/2020 | | |
| KR | 2009113106 | 10/2009 | | |
| KR | 10-0982468 | 9/2010 | | |
| WO | WO-2020203879 A1 * | 10/2020 | ............ | H01M 10/48 |
| WO | WO-2021196665 A1 * | 10/2021 | ........ | H01M 10/0525 |

OTHER PUBLICATIONS

The Extended European Search Report (EESR) from European Patent Office (EPO) dated Aug. 21, 2024 for the related European Patent Application No. 21842428.1.
International Search Report of PCT application No. PCT/JP2021/022958 dated Sep. 7, 2021.

* cited by examiner

FIG. 11

BATTERY AND METHOD FOR MANUFACTURING THE SAME

BACKGROUND

1. Technical Field

The present disclosure relates to a battery and a method for manufacturing the same.

2. Description of the Related Art

Japanese Unexamined Patent Application Publication No. 2004-39271 discloses a lithium-ion battery having insulating spacers disposed in the corner portions of a rectangular power generating element within a laminated film. Further, Japanese Unexamined Patent Application Publication No. 2012-221608 discloses a battery including a fluid-containing pressurized substance and a resin material such as polyethylene between an exterior material and a power generating element.

SUMMARY

One non-limiting and exemplary embodiment provides a highly-reliable battery.

In one general aspect, the techniques disclosed here feature a battery including a power generating element and an insulating member. The power generating element has at least one battery cell including a positive electrode, a negative electrode, and a solid electrolyte layer, and the insulating member covers a side surface of the power generating element and having contact with the side surface. The insulating member has a wraparound portion continuously extending over an area from the side surface to a main surface of the power generating element and covering the side surface and the main surface and having contact with the side surface and the main surface.

The present disclosure makes it possible to achieve a highly-reliable battery.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a cross-sectional view for explaining a method for manufacturing a battery according to an embodiment.

DETAILED DESCRIPTIONS

Brief Overview of the Present Disclosure

Figure 1:
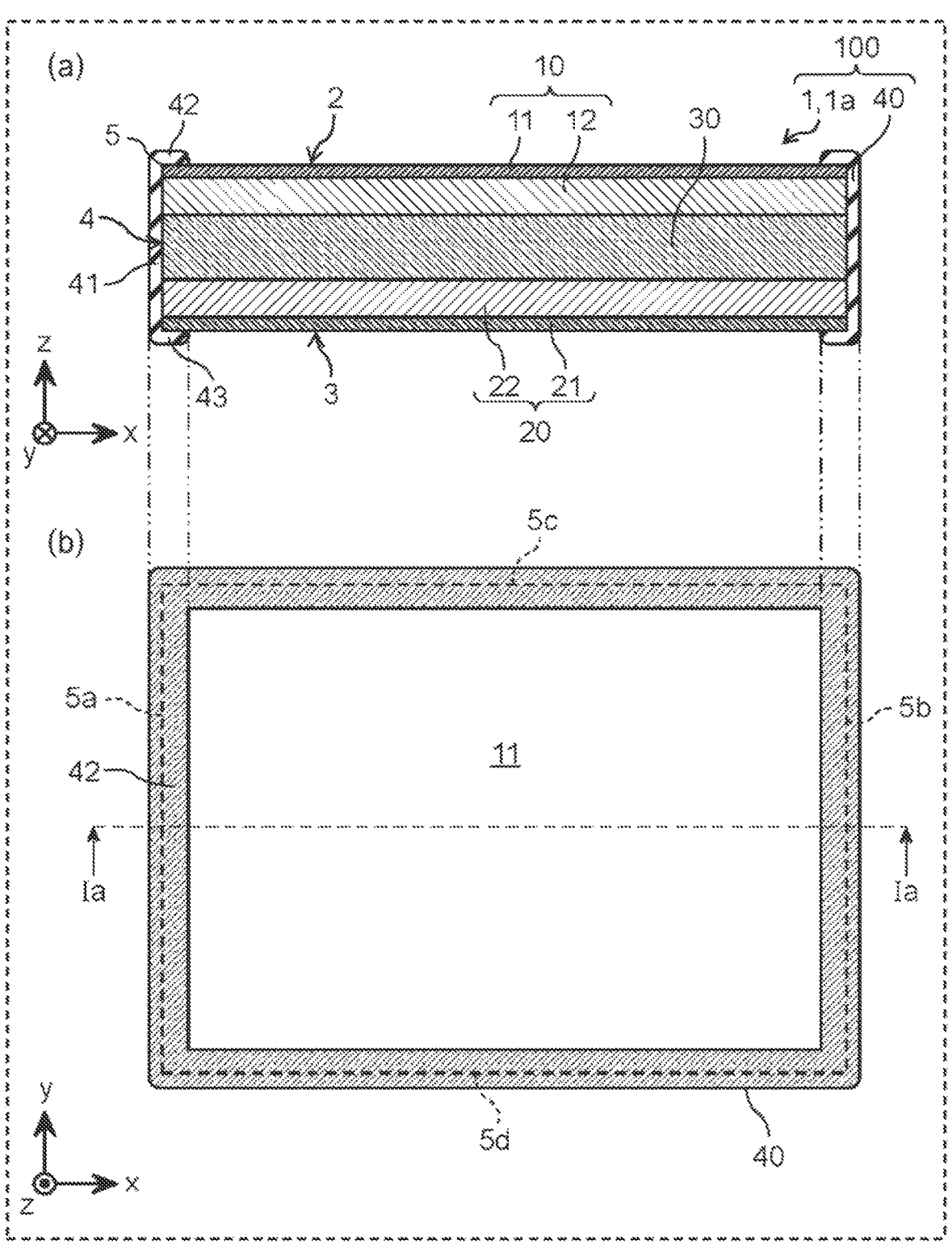
FIG. 1 illustrates a cross-sectional view and a plan view both schematically showing a configuration of a battery according to Embodiment 1.

A battery according to an aspect of the present disclosure includes a power generating element and an insulating member. The power generating element has at least one battery cell including a positive electrode, a negative electrode, and a solid electrolyte layer, and the insulating member covers a side surface of the power generating element and having contact with the side surface. The insulating member has a wraparound portion continuously extending over an area from the side surface to a main surface of the power generating element and covering the side surface and the main surface and having contact with the side surface and the main surface.

This configuration makes it possible to prevent a short circuit, foreign-body contact, or other failures in the side surface of the power generating element. This also brings about an effect of anchoring the outer periphery of the power generating element, at which the layer tends to start delaminating in the presence of the application of external stress such as bending stress. This makes it possible to achieve a highly-reliable battery. This also makes it possible to thin the battery while enhancing reliability against vibration and thermal shock, thus making it possible, for example, to obtain a high-energy-density and high-capacity battery.

Further, for example, an outer surface of the wraparound portion may be rounded.

This makes it possible to reduce damage, such as chipping of a corner or ridge line of the power generating element, that is caused, for example, by handling or shock. Further, in a case where the battery is sealed with a laminated film, the battery can be set in the laminate film with a reduction in the occurrence of catching and damage on and to an inner wall of the laminated film. Further, the formation of a defect, such as a pin hole, starting from a corner or ridge line of the power generating element can be reduced even in the event of a shock. This brings about high sealing reliability.

Further, for example, the insulating member may have a side wall portion covering a center of the side surface and having contact with the center, and a thickness of the wraparound portion may be greater than a thickness of the side wall portion. Simply put, the wraparound portion further rises, projects, or bulges than other portions of the insulating member.

This allows the positive electrode, the negative electrode, and the solid electrolyte layer to be more firmly anchored to one another. For example, on the outer periphery of the power generating element, a collector and an active material layer that the positive electrode or the negative electrode has can be anchored to each other. Further, the insulating member also acts as a framework structure, thus bringing about improvement in strength of a thinned battery. Further, the provision of the wraparound portion makes it possible to reduce scratch damage to a main surface of the power generating element when the battery is mounted. These make it possible to obtain a more highly-reliable battery.

Further, for example, the insulating member may have a side wall portion covering a center of the side surface and having contact with the center, and a thickness of the side wall portion may be greater than a thickness of the wraparound portion.

This makes it possible to more robustly protect a central portion of the side surface, making it possible to suppress, for example, delamination of the solid electrolyte layer. This makes it possible to obtain a more highly-reliable battery.

Further, for example, the wraparound portion may have a shape curved convexly toward a center of the main surface in a plan view of the main surface.

This reduces the likelihood of occurrence of undesirable cleavages in a central region edge face due in particular to an external stress that imparts bending, which tends to surface in a large-sized battery. This makes it possible to obtain a highly-reliable large-sized battery.

Further, for example, the wraparound portion may be provided at one or more corners among four corners of the main surface.

This makes it possible to reduce damage, such as chipping of a corner of the power generating element, that may occur due, for example, to handling or shock. Further, in a case where the battery is sealed with a laminated film, the battery can be set in the laminate film with a reduction in the occurrence of catching and damage on and to an inner wall of the laminated film. Further, the formation of a defect, such as a pin hole, starting from a corner of the power generating element can be reduced even in the event of a shock. This brings about high sealing reliability.

Further, for example, the side surface may have a step.

Even such a configuration enhances the bondability between the insulating member and the side surface of the power generating element and also improves bending resistance, thus giving a more highly-reliable battery.

Further, for example, at least one of the positive electrode or the negative electrode may have a collector and an active material layer located between the collector and the solid electrolyte layer, and the main surface may be a surface of the collector that faces away from a surface of the collector on which the solid electrolyte layer is provided.

In this way, the collector can be integrated with the active material layer and the solid electrolyte layer by further firmly bonding the collector to the active material layer and the solid electrolyte layer. This gives a highly-reliable battery. Further, an edge of an active metal surface exposed by cutting the collector can be covered with the insulating member. The term "active metal surface" here means a surface to which a substance that may react with oxygen, nitrogen, moisture, and a metal such as an organic component is not adsorbed. This makes it possible to prevent the collector from reacting with an atmospheric component or a surrounding substance, thus giving a more highly-reliable battery.

Further, for example, the insulating member may be softer than the solid electrolyte layer and the active material layer.

This makes it possible to absorb a stress produced at the interface between the insulating member and the side surface of the power generating element at the time of thermal stress or shock. This makes it possible to ensure the bondability of the insulating member, and also makes it possible to protect the power generating element from shock. This gives a highly-reliable battery.

Further, for example, the insulating member may fill an edge of at least one of the solid electrolyte layer or the active material layer that touches the side surface.

This enhances the bondability between the insulating member and the side surface of the power generating element, thus giving a more highly-reliable battery.

Further, for example, the insulating member may contain resin.

This makes it possible to reduce the formation of pores in the insulating member and form a dense and firmly-anchored insulating member, thus giving a more highly-reliable battery.

Further, for example, the insulating member may have a laminating structure of a plurality of insulating films. Further, for example, the plurality of insulating films may contain resin materials different from each other.

This makes it possible to obtain an insulating member of properties that cannot be attained with a single-layer film. For example, the insulating member can be made higher in reliability and airtightness than in the case of a single-layer film.

Further, for example, the plurality of insulating layers may be different in hardness from each other.

This ensures high anchoring properties against a heat cycle or other stresses, for example, by forming a soft insulating film on a surface of bonding with the side surface of the power generating element and forming a hard insulating film as a surface layer. Using such a plurality of resin materials makes it possible to achieve a more highly-reliable battery.

Further, for example, the plurality of insulating layers may include a first film touching the side surface, and the first film may be softer than the solid electrolyte layer.

This brings about improvement especially in heat cycle resistance of anchoring properties and sealing properties of an insulating material.

Further, for example, the first film may be softer than the solid electrolyte layer at a temperature lower than or equal to a lower limit of an operating temperature range.

This brings about improvement especially in heat cycle resistance of anchoring properties and sealing properties of an insulating material in an environment in which the battery is used.

Further, for example, the plurality of insulating films may include a first film touching the side surface and a second film entirely covering a surface of the first film that faces away from the side surface.

This makes it possible to form an insulating film with superior sealing properties, thus giving a highly-reliable battery.

Further, for example, the at least one battery cell comprises a plurality of battery cells, and the plurality of battery cells are laminated.

This gives a high-capacity or high-energy-density highly-reliable battery.

Further, for example, the solid electrolyte layer may contain a solid electrolyte having lithium-ion conductivity.

This gives a high-capacity and high-energy battery.

Further, a method for manufacturing a battery according to an aspect of the present disclosure may include immersing, in an insulating material, a side surface of a power generating element having at least one battery cell including a positive electrode, a negative electrode, and a solid electrolyte layer.

This makes it possible to easily for an insulating member on a side surface of a battery.

As noted above, the battery according to each aspect of the present disclosure prevents an interelectrode short circuit that tends to occur as an all-solid battery becomes thinner, and improves shock-absorbing properties or other properties, making it possible to bring about improvement in reliability. This makes it possible to thin the battery, making it possible to achieve a high-energy-density and high-capacity highly-reliable battery.

The following describes embodiments in concrete terms with reference to the drawings.

It should be noted that the embodiments to be described below each illustrate a comprehensive and specific example. The numerical values, shapes, materials, constituent elements, placement and topology of constituent elements, manufacturing steps, order of manufacturing steps, or other features that are shown in the following embodiments are just a few examples and are not intended to limit the present disclosure. Further, those of the constituent elements in the following embodiments which are not recited in an independent claim are described as optional constituent elements.

Further, the drawings are schematic views, and are not necessarily strict illustrations. Accordingly, for example, the drawings are not necessarily to scale. Further, in the drawings, substantially the same components are given the same reference signs, and a repeated description may be omitted or simplified.

Further, in the present specification and drawings, the x axis, the y axis, and the z axis represent the three axes of a three-dimensional orthogonal coordinate system. In each of the embodiments, the z-axis direction is a thickness direction of a battery. Further, the term "thickness direction" used herein means a direction perpendicular to a plane of laminating of each layer.

Further, the term "plan view" used herein means a case where the battery is seen from an angle parallel with a direction of laminating in the battery, and the term "thickness" used herein means the length of the battery and each layer in the direction of laminating.

Further, the terms "inner" and "outer" in terms such as "inner side" and "outer side" used herein mean the inside, which is close to the center of the battery, and outside, which is close to the outer edge of the battery, of the battery as seen from an angle parallel with the direction of laminating in the battery.

Further, the terms "upper" and "lower" in the configuration of a battery used herein do not refer to an upward direction (upward in a vertical direction) and a downward direction (downward in a vertical direction) in absolute space recognition, but are used as terms that are defined by a relative positional relationship on the basis of an order of laminating in a laminating configuration. Further, the terms "above" and "below" are applied not only in a case where two constituent elements are placed at a spacing from each other with another constituent element present between the two constituent elements, but also in a case where two constituent elements touch each other by being placed in close contact with each other.

Embodiment 1

Brief Overview of Battery

First, a battery according to the present embodiment is described.

FIG. 1 is a diagram schematically showing a configuration of a battery 100 according to the present embodiment. Specifically, (a) of FIG. 1 is a cross-sectional view of the battery 100 according to the present embodiment, and (b) of FIG. 1 is a plan view of the battery 100 as seen from the positive side of the z-axis direction. (a) of FIG. 1 shows a cross-section as taken along line Ia-Ia in (b) of FIG. 1. Further, in (b) of FIG. 1, an insulating member 40 is shaded so that the planimetric shape of the insulating member 40 is clarified. The same applies to the after-mentioned other plan views.

As shown in FIG. 1, the battery 100 includes a power generating element 1 and an insulating member 40. The battery 100 is an all-solid battery.

The power generating element 1 is a flat and cuboidal laminated body. As shown in (a) of FIG. 1, the power generating element 1 has a main surface 2, a main surface 3 that faces away from the main surface 2, and a side surface 4.

The insulating member 40 covers the side surface 4 of the power generating element 1 while having contact with the side surface 4. Specifically, the insulating member 40 continuously extends over an area from the main surface 2 to the side surface 4 of the power generating element 1 and covers the main surface 2 and the side surface 4 while having contact with the main surface 2 and the side surface 4. More specifically, the insulating member 40 continuously extends over an area from the main surface 2 to the main surface 3 of the power generating element 1 and covers the main surface 2, the side surface 4, and the main surface 3 while having contact with the main surface 2, the side surface 4, and the main surface 3. It should be noted that the insulating member 40 covers each of the main surfaces 2 and 3 along the edges of each surface. That is, the insulating member 40 leaves at least a central portion of each of the main surfaces 2 and 3 exposed.

With this configuration, the present embodiment makes it possible to prevent a short circuit, foreign-body contact, or other failures in the side surface 4 of the power generating element 1. This also brings about an effect of anchoring the outer periphery of each layer, at which the layer tends to start delaminating in the presence of the application of external stress such as bending stress. This makes it possible to achieve a highly-reliable battery 100. This also makes it possible to thin the battery 100 while enhancing reliability against vibration and thermal shock, thus making it possible, for example, to obtain a high-energy-density and high-capacity battery 100.

Configuration of Power Generating Element

The following describes a configuration of the power generating element 1 in concrete terms.

The power generating element 1 includes a battery cell 1a including an electrode layer 10, a counter-electrode layer 20, and a solid electrolyte layer 30, located between the electrode layer 10 and the counter-electrode layer 20, that touches each of the layers. In the present embodiment, the power generating element 1 has only one battery cell 1a. That is, the power generating element 1 according to the present embodiment 1 is identical with the battery cell 1a.

The electrode layer 10 has a collector 11 and an active material layer 12. Further, the counter-electrode layer 20 has a collector 21 and an active material layer 22. The solid electrolyte layer 30 is located between the active material layer 12 and the active material layer 22, and has contact with each of the layers.

The collector 11, the active material layer 12, the solid electrolyte layer 30, the active material layer 22, and the collector 21 are each rectangle in planimetric shape. The planimetric shapes of the collector 11, the active material layer 12, the solid electrolyte layer 30, the active material layer 22, and the collector 21 are not limited to particular shapes but may be non-rectangular shapes such as circles, ellipses, or polygons.

Further, although, in the present embodiment, the collector 11, the active material layer 12, the solid electrolyte layer 30, the active material layer 22, and the collector 21 are identical in size to one another and of uniform contour in plan view, this is not intended to impose any limitation. For example, the active material layer 12 may be smaller than the active material layer 22. The active material layer 12 and the active material layer 22 may be smaller than the solid electrolyte layer 30. For example, part of the solid electrolyte layer 30 may be in contact with at least one of the collectors 11 and 21.

The main surface 2 of the power generating element 1 is a surface of the collector 11 that faces away from a surface of the collector 11 on which the active material layer 12 is provided. The main surface 2 is part of an outer surface of the power generating element 1. The main surface 2 is rectangular in planimetric shape.

The main surface 3 of the power generating element 1 is a surface of the collector 21 that faces away from a surface of the collector 21 on which the active material layer 22 is provided. The main surface 3 is part of an outer surface of the power generating element 1. The main surface 3 is rectangular in planimetric shape.

The power generating element 1 has ridge lines 5a, 5b, 5c, and 5d indicated by dashed lines in (b) of FIG. 1. Each of the ridge lines 5a, 5b, 5c, and 5d corresponds to a side of a cuboid at which the main surface 2 and the side surface 4 are connected to each other. Since the main surface 2 is rectangular in planimetric shape, the ridge lines 5a and 5b are parallel to each other and the ridge lines 5c and 5d are parallel to each other. It should be noted that in the following description, the ridge lines 5a, 5b, 5c, and 5d are described as "ridge line 5" in a case where they are not particularly distinguished from one another.

The power generating element 1 may have the shape of a flat prims such as a hexagonal prism or an octagonal prism, or may have the shape of a flat cylinder or cylindroid. The word "flat" means that the thickness is smaller than the width of the base.

In the present embodiment, the electrode layer 10 serves as a positive electrode, and the counter-electrode layer 20 serves as a negative electrode. Specifically, the collector 11 serves as a positive-electrode collector, and the active material layer 12 serves as a positive-electrode active material layer. The collector 21 serves as a negative-electrode collector, and the active material layer 22 serves as a negative-electrode active material layer.

Alternatively, the electrode layer 10 may serve as a negative electrode, and the counter-electrode layer 20 may serve as a positive electrode. Specifically, the collector 11 may serve as a negative-electrode collector, and the active material layer 12 may serve as a negative-electrode active material layer. Specifically, the collector 21 may serve as a positive-electrode collector, and the active material layer 22 may serve as a positive-electrode active material layer.

In the following description, the positive-electrode active material layer and the negative-electrode active material layer are sometimes referred to simply as "active material layer". Further, the positive-electrode collector and the negative-electrode collector are sometimes referred to simply as "collector".

The collectors 11 and 21 each need only be formed of a material having electric conductivity and are not limited to particular collectors. The collector s 11 and 21 may each be made, for example, of a foil-like body, a plate-like body, or a net-like body composed, for example, of stainless steel, nickel (Ni), aluminum (Al), iron (Fe), titanium (Ti), copper (Cu), palladium (Pd), gold (Au), platinum (Pt), or an alloy of two or more of these metals. The materials of the collectors 11 and 21 are selected as appropriate in consideration of manufacturing processes, non-solubility and non-decomposability of the material at operating temperature and under working pressure, and the operating potential of a battery that is applied to the collectors 11 and 21, and the electrical conductivity of the battery. Further, the materials of the collectors 11 and 21 may also be selected according to tensile strength and heat resistance requirements. The collectors 11 and 21 may each be made of a clad material including a laminating structure of sheets of high-strength electrolytic copper foil or dissimilar metal foil.

The collectors 11 and 21 each have, but are not limited to, a thickness, for example, greater than or equal to 10 μm and smaller than or equal to 100 μm. From the point of view of enhancing the adhesion with the active material layer 12 or 22, the collector 11 or 21 may have its surface processed into a rough surface with asperities. Further, the collector 11 or 21 may have its surface coated with an adhesive component such as an organic binder. This strengthens the bondability of an interface between the collector 11 or 21 and another layer, making it possible to enhance the mechanical and thermal reliability, cycle characteristic, or other features of the battery 100.

The active material layer 12 is located between the collector 11 and the solid electrolyte layer 30. Specifically, the active material layer 12 is placed in touch with a main surface of the collector 11 that faces toward the solid electrolyte layer 30. In the present embodiment, the active material layer 12 entirely covers the main surface of the collector 11. The active material layer 12, which is a positive-electrode active material layer, contains at least a positive-electrode active material. That is, the active material layer 12 is a layer composed mainly of a positive-electrode material such as the positive-electrode active material.

The positive-electrode active material is a substance that is oxidized or reduced by the insertion or desorption of metal ions such as lithium (Li) ions or magnesium (Mg) ions into or out of a crystal structure at a potential higher than that of a negative electrode. The type of the positive-electrode active material can be selected as appropriate according to the type of the battery 100, and a publicly-known positive-electrode active material may be used.

As the positive-electrode active material, a compound containing lithium and a transition metal element is used. Usable examples include an oxide containing lithium and a transition metal element and a phosphate compound containing lithium and a transition metal element. Usable examples of the oxide containing lithium and a transition metal element include a lithium-nickel complex compound such as $LiNi_xM_{1-x}O_2$ (where M is at least one element of Co, Al, Mn, V, Cr, Mg, Ca, Ti, Zr, Nb, Mo, and W and x is $0 < x \leq 1$), a lamellar oxide such as lithium cobalt oxide ($LiCoO_2$), lithium nickel oxide ($LiNiO_2$), and lithium manganese oxide ($LiMn_2O_4$), and spinel structure lithium manganese oxides ($LiMn_2O_4$, $Li_2MnO_3$, $LiMnO_2$). Usable examples of the phosphate compound containing lithium and a transition metal element include olivine structure lithium iron phosphate ($LiFePO_4$). Alternatively, sulfur (S) or a sulfide such as lithium sulfide ($Li_2S$) may be used. In that case, the positive-electrode active material may be one obtained by coating positive-electrode active material particles with lithium niobate ($LiNbO_3$) or other substances or adding lithium niobate ($LiNbO_3$) or other substances to positive-electrode active material particles. As the positive-electrode active material, only one of these materials may be used, or a combination of two or more of these materials may be used.

As mentioned above, the active material layer 12, which is a positive-electrode active material layer, needs only contain at least the positive-electrode active material. The active material layer 12 may be a compound layer composed of the positive-electrode active material and another additive material. Usable example of another additive material include a solid electrolyte such as an inorganic solid electrolyte or a sulfide solid electrolyte, a conductive auxiliary agent such as acetylene black, and a binding binder such as polyethylene oxide or polyvinylidene fluoride. Mixing the positive-electrode active material and another additive material such as a solid electrolyte in predetermined proportions allows the active material layer 12 to have improved lithium-ion conductivity within the active material layer 12 and to have improved electron conductivity.

The active material layer 12 has, but is not limited to, a thickness, for example, greater than or equal to 5 μm and smaller than or equal to 300 μm.

The active material layer 22 is located between the collector 21 and the solid electrolyte layer 30. Specifically, the active material layer 22 is placed in touch with a main surface of the collector 21 that faces toward the solid electrolyte layer 30. In the present embodiment, the active material layer 22 entirely covers the main surface of the collector 21. The active material layer 22, which is a negative-electrode active material layer, contains at least a negative-electrode active material. That is, the active material layer 22 is a layer composed mainly of a negative-electrode material such as the negative-electrode active material.

The negative-electrode active material refers to a substance that is oxidized or reduced by the insertion or desorption of metal ions such as lithium (Li) ions or magnesium (Mg) ions into or out of a crystal structure at a potential lower than that of a positive electrode. The type of the negative-electrode active material can be selected as appropriate according to the type of the battery 100, and a publicly-known negative-electrode active material may be used.

Usable examples of the negative-electrode active material include a carbon material such as natural graphite, artificial graphite, graphite carbon fiber, resin heat-treated carbon and an alloy material that is combined with a solid electrolyte to form a compound. Usable examples of the alloy material include a lithium alloy such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, or $LiC_6$, an oxide of lithium and a transition metal element such as lithium titanium oxide ($Li_4Ti_5O_{12}$), zinc oxide (ZnO), and a metal oxide such as silicon oxide ($SiO_x$). As the negative-electrode active material, only one of these materials may be used, or a combination of two or more of these materials may be used.

As mentioned above, the active material layer 22, which is a negative-electrode active material layer, needs only contain at least the negative-electrode active material. The active material layer 22 may be a compound layer composed of the negative-electrode active material and another additive material. Usable example of another additive material include a solid electrolyte such as an inorganic solid electrolyte or a sulfide solid electrolyte, a conductive auxiliary agent such as acetylene black, and a binding binder such as polyethylene oxide or polyvinylidene fluoride. Mixing the negative-electrode active material and another additive material such as a solid electrolyte in predetermined proportions allows the active material layer 22 to have improved lithium-ion conductivity within the active material layer 22 and to have improved electron conductivity.

The active material layer 22 has, but is not limited to, a thickness, for example, greater than or equal to 5 μm and smaller than or equal to 300 μm.

The solid electrolyte layer 30 are disposed between the active material layer 12 and the active material layer 22, and is in touch with each of the layers. The solid electrolyte layer 30 contains at least a solid electrolyte.

The solid electrolyte needs only be a publicly-known battery-use solid electrolyte having ion conductivity. Usable examples of the solid electrolyte include a solid electrolyte that conducts metal ions such as lithium ions and magnesium ions. The type of the solid electrolyte needs only be selected as appropriate according to the type of ion to be conducted.

Usable examples of the solid electrolyte include an inorganic solid electrolyte such as a sulfide solid electrolyte or an oxide solid electrolyte. Usable examples of the sulfide solid electrolyte include a lithium-containing sulfide such as $Li_2S$—$P_2S_5$, $Li_2S$—$SiS_2$, $Li_2S$—$B_2S_3$, $Li_2S$—$GeS_2$, $Li_2S$—$SiS_2$—LiI, $Li_2S$—$SiS_2$—$Li_3PO_4$, $Li_2S$—$Ge_2S_2$, $Li_2S$—$GeS_2$—$P_2S_5$, or $Li_2S$—$GeS_2$—ZnS. Usable examples of the oxide solid electrolyte include a lithium-containing metal oxide such as $Li_2O$—$SiO_2$ or $Li_2O$—$SiO_2$—$P_2O_5$, a lithium-containing metal nitride such as $Li_xP_yO_{1-z}N_z$, lithium phosphate ($Li_3PO_4$), and a lithium-containing transition metal oxide such as a lithium titanium oxide. As the solid electrolyte, only one of these materials may be used, or a combination of two or more of these materials may be used. In the present embodiment, the solid electrolyte layer 30 contains, as an example, a solid electrolyte having lithium-ion conductivity.

The solid electrolyte layer 30 may contain a binding binder such as polyethylene oxide or polyvinylidene fluoride in addition to the aforementioned solid electrolyte material.

The solid electrolyte layer 30 has, but is not limited to, a thickness, for example, greater than or equal to 5 μm and smaller than or equal to 150 μm.

It should be noted that the solid electrolyte layer 30 may be configured as an aggregate of particles of the solid electrolyte. Alternatively, the solid electrolyte layer 30 may be constituted by sintered tissue of the solid electrolyte.

Insulating Member

Next, a configuration of the insulating member 40 is described in concrete terms.

The insulating member 40 covers the side surface 4 of the power generating element 1 while having contact with the side surface 4. It is preferable that the insulating member 40 cover more of the side surface 4. For example, the insulating member 40 entirely covers the side surface 4 of the power generating element 1. That is, the side surface 4 is not exposed. Specifically, the insulating member 40 cover all of an edge face of each of the collectors 11 and 21, an edge face of each of the active material layers 12 and 22, and an edge face of the solid electrolyte layer 30. The coverage of the side surface 4 by the insulating member 40 makes it possible to block out atmospheric gases, making it possible to obtain a highly-reliable battery 100.

In particular, a processed part of a collector, i.e. a highly-active broken-out section exposed immediately after cutting, reacts easily with both an atmospheric gas component or a constituent member of the battery 100. For example, in a case where the collector 11 or 21 is composed of Cu, copper sulfide is easily formed. This reaction locus serves as a starting point, with the result that during passage of a long period of time or battery operation, the reaction progresses to the surrounding area or the inside to such a level as to invite property degradation.

To address such a problem, the battery 100 according to the present embodiment uses the insulating member 40 to cover the active surface of the edge face of each of the collectors 11 and 21 and block contact with external gas or agents. This makes it possible to suppress corrosion of the collectors 11 and 21 or a reaction with surrounding substances.

It should be noted that the adsorption state of a surface of the collector 11 or 21 can be analyzed by a surface analysis method such as X-ray photoelectron spectroscopy (XPS or ESCA (electron spectroscopy for chemical analysis)).

For example, in terms of reducing the risk of a short circuit by foreign-body adhesion, the insulating member 40 needs only be provided regardless of thickness. The insulating member 40 can sufficiently reduce the risk of a short circuit in the power generating element 1 by entirely covering the side surface 4 while having contact with the side surface 4.

At this point in time, electrical insulation can be sufficiently enhanced, provided the insulating member 40 has a thickness greater than or equal to 10 μm. Furthermore, shock absorption can be enhanced, provided the insulating member 40 has, for example, a thickness greater than or equal to 100 μm. Further, the capability to block out atmospheric air or moisture can be enhanced, provided the insulating member 40 has, for example, a thickness greater than or equal to 1 mm. Although there is no particular upper limit on the thickness of the insulating member 40, an appropriate thickness is set for the purpose of reducing deterioration of energy density or volume capacity density of the battery 100.

It should be noted that these thicknesses are just a few examples and may be subject to change as appropriate depending on the type of a material contained in the insulating member 40. For example, for the blocking out of moisture and gas, a thickness greater than or equal to 50 μm in the case of epoxy resin brings about an effect of blocking out gas and moisture. As a simplified test on the blocking capability of the insulating member 40, an estimation of a practical blocking capability of the insulating member 40 can be made by checking the operation of a power generating element 1, left exposed to the atmosphere, that contains a moisture-susceptible LPS sulfide solid electrolyte.

For example, in a case where the side surface 4 of a power generating element 1 containing a sulfide solid electrolyte and having a size of 20 mm long×20 mm wide×0.2 mm thick was covered with an epoxy resin having a thickness of 50 μm, the battery exhibited charge and discharge characteristics without problems for approximately five hours. On the other hand, in a case where the side surface 4 of a power generating element 1 of the same size containing a sulfide solid electrolyte was left exposed, a short circuit was observed after thirty minutes of being left exposed to the atmosphere. That is, it was confirmed that the coverage by the insulating member 40 brings about improvement in durability of the battery 100. By such a method, an actual effect of blocking out moisture and gas can be estimated.

Further, the thickness of the insulating member 40 may be a thickness greater than or equal to 150 μm. In this case, a durability longer than or equal to 300 hours was observed in the aforementioned simplified test. Thus, by conducting simplified tests with varying thicknesses, a thickness that brings about a stronger blocking effect can be found. For example, by conducting a simplified test in advance according to the properties of the insulating member 40 or the environment that the insulating member 40 is required to withstand, the material and thickness of the insulating member 40 can be set as appropriate.

It should be noted that it is preferable for the realization of high reliability that the thickness of the insulating member 40 be as great as possible. On the other hand, as a matter of course, this invites an increase in volume. Therefore, it is desirable for balance between capacity and energy densities and reliability that appropriate settings be configured at levels required.

It should be noted that the insulating member 40 needs only be an electric insulator. Specifically, the insulating member 40 contains insulating resin. For example, the insulating member 40 may contain a liquid or powder thermosetting epoxy resin.

In the present embodiment, the insulating member 40 is softer than the solid electrolyte layer 30 and the active material layers 12 and 22. Further, the insulating member 40 is softer than the collectors 11 and 21. For example, the insulating member 40 may be made of a common epoxy hardness material having a modulus of elasticity higher than or equal to 10 GPa and lower than or equal to 40 GPa.

This makes it possible to protect the battery 100 by absorbing a shock to a site covered with the insulating member 40 and maintaining the reliability of a bonding interface. Further, even if a heat cycle acts, the softness of the insulating member 40 absorbs a stress, attributed to a mutual difference in thermal expansion, that acts on an interface with the insulating member 40. This makes it possible to reduce adverse effects, such as cracks, on a solid tissue structure of the power generating element 1.

As in the case of Vickers hardness measurement, the relationship in softness between the collectors 11 and 21, the active material layers 12 and 22, and the solid electrolyte layer 30 and the insulating member 40 may be determined from a comparison of the magnitude relationships between traces of a rigid indenter placed on targets of measurement. For example, when the indenter is pressed against each site of a cross-section of the power generating element 1 and the insulating member 40, the insulating member 40 becomes more greatly depressed than any other sites.

Further, the aforementioned relationship in softness may hold over an operating temperature range of the battery 100. In general, a lower temperature tends to lead to a higher hardness of resin contained in the insulating member 40. For this reason, the insulating member 40 needs only be softer than the solid electrolyte layer 30 and the active material layers 12 and 22 at a temperature lower than or equal to a lower limit of the operating temperature range. For example, at low temperatures ranging, for example, from 0° C. to −25° C., the insulating member 40 is softer than the solid electrolyte layer 30 and the active material layers 12 and 22. This makes it possible to bring about improvement especially in heat cycle resistance of the battery 100.

The insulating member 40 according to the present embodiment covers part of each of the main surfaces 2 and 3 as well as the side surface 4. Specifically, as shown in (a) of FIG. 1, the insulating member 40 has a side wall portion 41 and two wraparound portions 42 and 43. The side wall portion 41 covers the center of the side surface 4 while having contact with the center.

The side wall portion 41 is provided in the shape of a ring along the side surface 4 of the power generating element 1. The side wall portion 41 covers a side surface of each of the solid electrolyte layer 30 and active material layers 12 and 22 of the power generating element 1 while having contact with the side surface.

The wraparound portion 42 continuously extends over an area from the side surface 4 to the main surface 2 of the power generating element 1 and covers the side surface 4 and the main surface 2 while having contact with the side surface 4 and the main surface 2. Specifically, the wraparound portion 42 covers all of the ridge lines 5a, 5b, 5c, and 5d while having contact with all of the ridge lines 5a, 5b, 5c, and 5d. That is, as shown in (b) of FIG. 1, the wraparound portion 42 is provided in the shape of a ring along the edges of the main surface 2 of the power generating element 1.

The wraparound portion 42 is for example a portion continuously covering part of the main surface 2, the ridge line 5, and part of the side surface 4. Specifically, the wraparound portion 42 continuously covers the edge face of the collector 11, part of the edge face of the active material layer 12. In the present embodiment, an outer surface of the wraparound portion 42 is rounded.

The wraparound portion 43 continuously extends over an area from the side surface 4 to the main surface 3 of the power generating element 1 and covers the side surface 4 and the main surface 3 while having contact with the side surface 4 and the main surface 3. The wraparound portion 43 is the same as the wraparound portion 42 except that the wraparound portion 43 covers the edges of the main surface 3, not the main surface 2. For this reason, the following gives a description with a focus on the wraparound portion 42. Features of the wraparound portion 42 are also applicable to the wraparound portion 43.

Providing the wraparound portion 42 brings about a working effect of further firmly bonding the collector 11 to each layer of the power generating element 1. For example, the collector 11 or each layer of the power generating element 1 can be prevented from delaminating under external stress such as thermal shock or stress. In particular, in response to bending stress, which tends to cause a problem for a large-sized cell, even a central part of the side surface 4 that tends to delaminate can be firmly anchored. This brings about improvement in bending resistance of the battery 100.

Further, the wraparound width of the wraparound portion 42 is equivalent to the thickness of the power generating element 1. The wraparound width is the distance from the ridge line 5 to an edge of the wraparound portion 42. The term "equivalent" here means, for example, a difference falling within the range of 110%.

This strikes a stress balance between the main surface 2 and the side surface 4, thus bringing about a working effect of sufficiently improving the integration of the power generating element 1 and the insulating member 40. For example, in the case of a power generating element 1 having a long side measuring 15 cm, a short side measuring 10 cm, and a thickness of 200 μm, an insulating member 40 having a thickness of approximately 150 μm is provided with a wraparound portion 42 having a wraparound width of approximately 200 μm. Such a configuration makes it possible to achieve the integrity of the battery 100 and block up a pathway of entry of atmospheric air or other gasses to the edge face of the collector 11 with the wraparound portion 42. Specifically, since the pathway of entry can be extended by the wraparound portion 42, the edge face of the collector 11 can be more robustly protected. As a matter of course, it is preferable that an appropriate range of wraparound widths be set, as setting an excessively great wraparound width invites a decrease in capacity density of the battery 100.

It should be noted that the side wall portion 41 and the wraparound portion 42 are continuously integrated with each other via the ridge line 5. With this, because of the principles of the working effects, each of the effects can be brought about simultaneously. Further, since the outer surface of the wraparound portion 42 is rounded, chipping and cracking by handling during assembling can be reduced. Further, for example, when the battery 100 is placed into an airtight bag made of a laminated film or other materials, a stress that damages a wall surface of the airtight bag can be reduced. This makes it possible to maintain high airtightness, making it possible to bring about improvement in sealing reliability of the battery 100.

Effects

According to the foregoing configuration, an insulating member 40 having at least one of wraparound portions 42 and 43 makes it possible to firmly prevent an interelectrode short circuit, foreign-body contact, and corrosion and reaction of a collector. Furthermore, the wraparound portions 42 and 43 bring about a working effect of firmly integrating all layers of the power generating element 1 of even a large-sized and low-profile battery 100. This makes it possible to thin the battery 100, in which structural damage or defects, as well as short circuits, tend to occur, giving a high-energy-density highly-reliable battery 100.

In this way, the present embodiment makes it possible to achieve a high-energy-density and high-capacity highly-reliable battery 100.

It should be noted that a comparison between the battery 100 according to the present embodiment and the configurations of the batteries described in Japanese Unexamined Patent Application Publication No. 2004-39271 and Japanese Unexamined Patent Application Publication No. 2012-221608 shows the following differences. Japanese Unexamined Patent Application Publication No. 2004-39271 discloses a lithium-ion battery having insulating spacers disposed in the corner portions of a rectangular power generating element within a laminated film. However, this lithium-ion battery is an electrolyte-containing battery. Further, the insulating spaces are not anchored to the power generating element. For this reason, the battery disclosed in Japanese Unexamined Patent Application Publication No. 2004-39271 is not structured such that a power generating element containing a solid electrolyte is anchored and integrated, and is different in purpose and configuration from the battery 100 according to the present embodiment.

Meanwhile, Japanese Unexamined Patent Application Publication No. 2012-221608 discloses a battery including a fluid-containing pressurized substance and a resin material member such as polyethylene between an exterior material and a power generating element. However, the fluid-containing pressurized substance and the resin material member are not anchored to the power generating element. For this reason, external stress such as a heat cycle or bending stress causes a collector and a separator such as a solid electrolyte layer to easily delaminate from each other. In this way, the battery disclosed in Japanese Unexamined Patent Application Publication No. 2012-221608 is different in purpose and configuration from the battery 100 according to the present embodiment.

On the other hand, the present embodiment makes it possible to achieve a high-energy-density and high-capacity highly-reliable battery 100 without causing problems such as those mentioned above. It should be noted Japanese Unexamined Patent Application Publication No. 2004-39271 and Japanese Unexamined Patent Application Publication No. 2012-221608 neither disclose nor suggest an all-solid battery including an insulating member 40 having at least one of wraparound portions 42 and 43.
Modification 1

The following describes Modification 1 of Embodiment 1. The following describes Modification 1 with a focus on differences from Embodiment 1 and omits or simplifies a description of common features.

Figure 2:
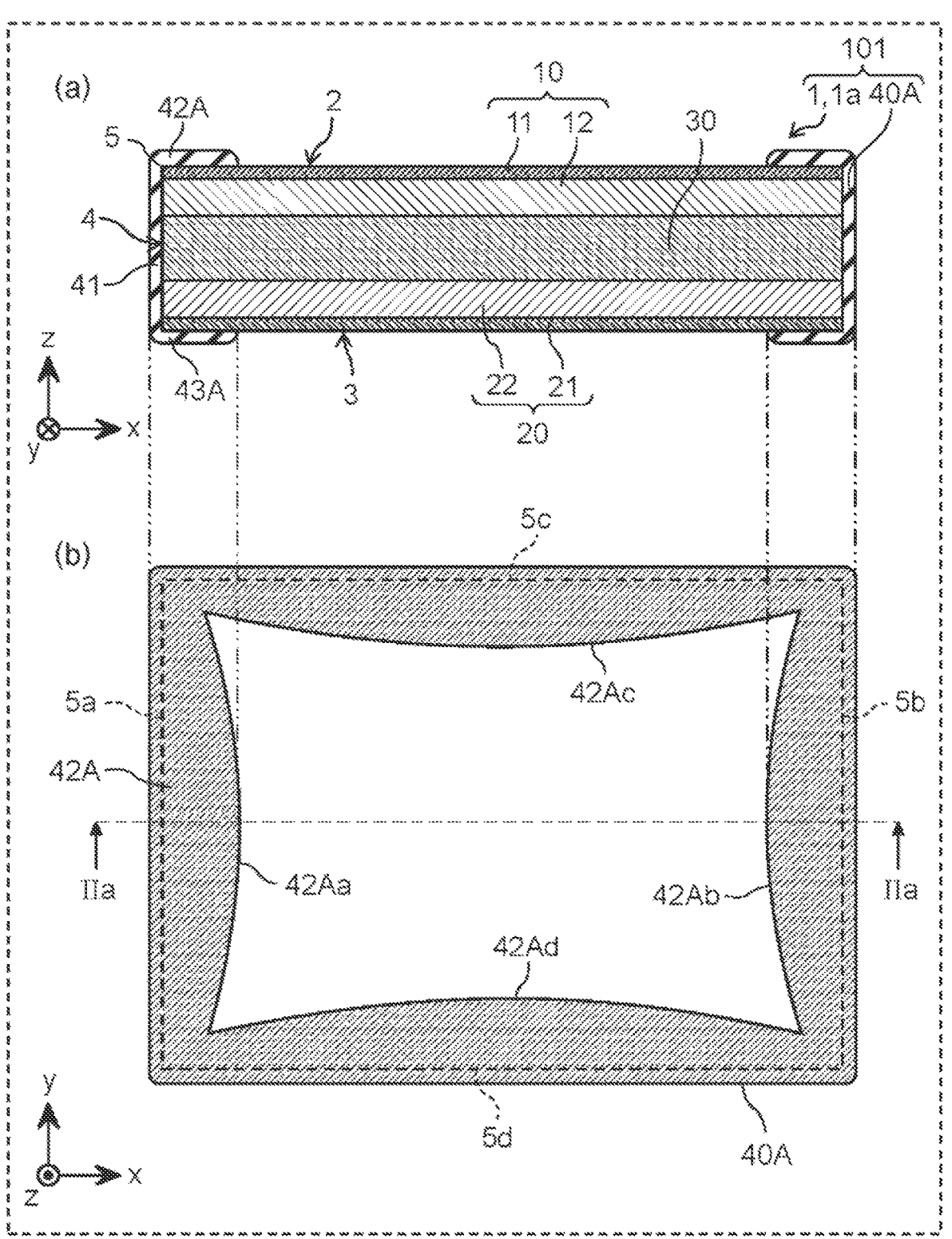
FIG. 2 illustrates a cross-sectional view and a plan view both schematically showing a configuration of a battery according to Modification 1 of Embodiment 1.

FIG. 2 is a diagram schematically showing a configuration of a battery 101 according to Modification 1 of Embodiment 1. Specifically, (a) of FIG. 2 is a cross-sectional view of the battery 101 according to the present modification, and (b) of FIG. 2 is a plan view of the battery 101 as seen from the positive side of the z-axis direction. (a) of FIG. 2 shows a cross-section as taken along line IIa-IIa in (b) of FIG. 2.

As shown in FIG. 2, the battery 101 according to the present modification differs from the battery 100 according to Embodiment 1 in that the battery 101 according to the present modification includes an insulating member 40A instead of the insulating member 40. The insulating member 40A includes wraparound portions 42A and 43A instead of the wraparound portions 42 and 43. The wraparound portion 43A is the same as the wraparound portion 42A except that the wraparound portion 43A covers the edges of the main surface 3, not the main surface 2. For this reason, the following gives a description with a focus on the wraparound portion 42A. Features of the wraparound portion 42A are also applicable to the wraparound portion 43A.

As shown in (b) of FIG. 2, the wraparound portion 42A has a shape curved convexly toward the center of the main surface 2 in a plan view of the main surface 2. The wraparound portion 42A has edges 42Aa, 42Ab, 42Ac, and 42Ad that face the ridge lines 5a, 5b, 5c, and 5d, respectively, and that are smoothly curved in the shape of elliptical arcs or circular arcs that are convex toward the center.

The curve width of the edge 42Aa is for example equivalent to the thickness of the battery 101. The curve width of the edge 42Aa is expressed by the distance between a straight line connecting both ends of the edge 42Aa and the position of part of the edge 42Aa that is furthest from the straight line. Examples of the position of part of the edge 42Aa that is furthest from the straight line connecting both ends of the edge 42Aa include, but are not limited to, the point of intersection of a perpendicular bisector of the ridge line 5a and the edge 42Aa. The curve width of each of the edges 42Ab, 42Ac, and 42Ad too are for example equivalent to the thickness of the battery 101.

Such a configuration subjects a large-sized and low-profile cell to holding over an area from an edge of a main surface of the collector 11 to an inside region. This allows each layer to be anchored without delaminating even in the presence of the application of bending stress. Further, a pathway of entry of moisture or other substances through the space between bonding surfaces of the collector 11 and the insulating member 40A can be blocked up. This makes it possible to extend the distance of entry, thus also bringing about improvement in environment resistance. In this way, the present modification makes it possible to achieve a thinner battery 101 with higher reliability.

It should be noted the convexly curved shape of the wraparound portion 42A is effective especially in suppressing delamination in the central part of each ridge line on which a bending stress acting on the battery 101 tends to concentrate. The working effect can be fully brought about by a curve width comparable to the thickness of the battery 101, although this effect can be brought about by even slightly curving away from the straight line.
Modification 2

Next, Modification 2 of Embodiment 1 is described. The following describes Modification 2 with a focus on differences from Embodiment 1 and omits or simplifies a description of common features.

Figure 3:
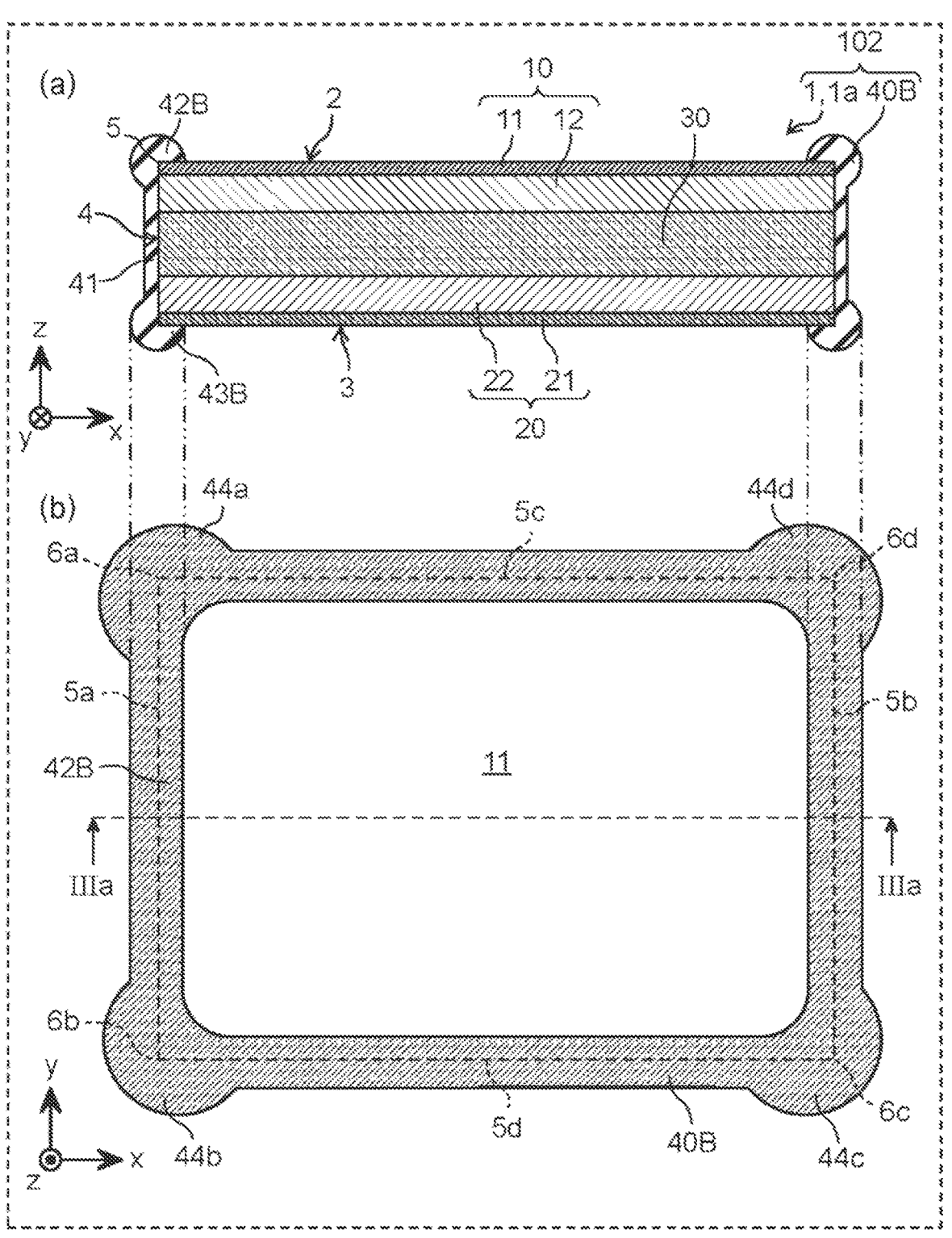
FIG. 3 illustrates a cross-sectional view and a plan view both schematically showing a configuration of a battery according to Modification 2 of Embodiment 1.
Figure 4:
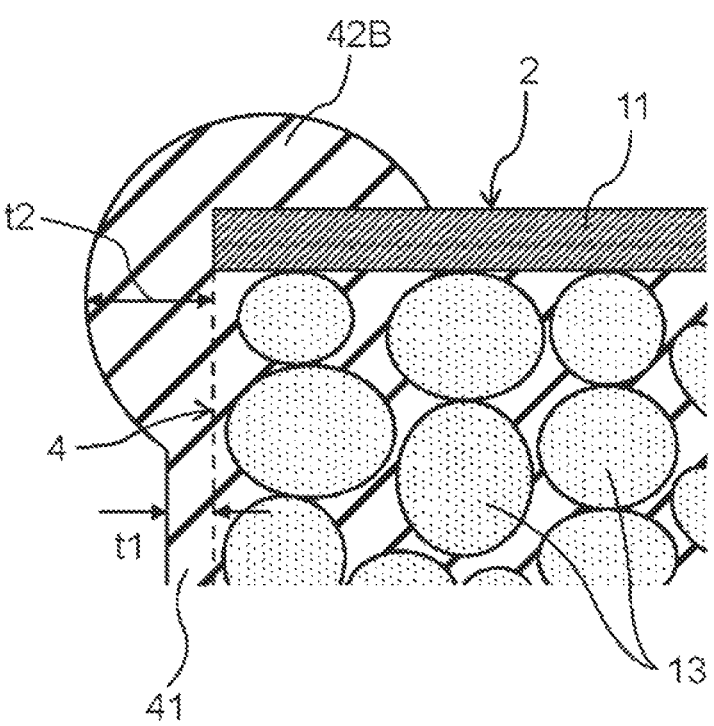
FIG. 4 is an enlarged cross-sectional view showing a partial enlargement of an insulating member of the battery according to Modification 2 of Embodiment 1.

FIG. 3 is a diagram schematically showing a configuration of a battery 102 according to Modification 2 of Embodiment 1. Specifically, (a) of FIG. 3 is a cross-sectional view of the battery 102 according to the present modification, and (b) of FIG. 3 is a plan view of the battery 102 as seen from the positive side of the z-axis direction. (a) of FIG. 3 shows a cross-section as taken along line IIIa-IIIa in (b) of FIG. 3. Further, FIG. 4 is an enlarged cross-sectional view showing a partial enlargement of an insulating member 40B of the battery 102 according to the present modification.

As shown in FIG. 3, the battery 102 according to the present modification differs from the battery 100 according to Embodiment 1 in that the battery 102 according to the present modification includes an insulating member 40B instead of the insulating member 40. The insulating member 40B includes wraparound portions 42B and 43B instead of the wraparound portions 42 and 43. The wraparound portion 43B is the same as the wraparound portion 42B except that the wraparound portion 43B covers the edges of the main surface 3, not the main surface 2. For this reason, the following gives a description with a focus on the wraparound portion 42B. Features of the wraparound portion 42B are also applicable to the wraparound portion 43B.

In the present modification the side wall portion 41 and the wraparound portion 42B are different in thickness from each other. Specifically, as shown in FIG. 4, the thickness t2 of the wraparound portion 42B is greater than the thickness t1 of the side wall portion 41. The side wall portion 41 is uniform in thickness t1. The thickness t2 of the wraparound portion 42B is expressed, for example, by the distance between the part of the wraparound portion 42B that is furthest from the side surface 4 and the side surface 4.

The increase in the thickness t2 of the wraparound portion 42B makes it possible to bring about improvement especially in resistance to bending, which tends to surface in a large-sized and low-profile battery. Specifically, the effect of strongly holding the main surface 2 over a wide area from the outer periphery to the inside can be brought into strong action by firmly holding the power generating element 1 with the side wall portion 41 and the wraparound portion 42B. This brings about an effect of suppressing delamination of the collector 11.

It should be noted that the height of the wraparound portion 42B, i.e. the distance between the part of the wraparound portion 42B that is furthest from the main surface 2 and the main surface 2, too is greater than the thickness t1 of the side wall portion 41. For example, the height of the wraparound portion 42B is equivalent to the thickness t2 of the wraparound portion 42B.

That is, as shown in FIG. 4, the wraparound portion 42B is raised to a high position than the main surface 2. For this reason, when the battery 102 is mounted on a predetermined installation surface, the power generating element 1 is supported mainly by the wraparound portion 42A instead of the collector 11, which forms the base of the battery 102. This makes it hard for the base of the collector 11, i.e. the main surface 2 of the power generating element 1, to make direct contact with the installation surface, thus reducing scratches or damage.

In the present modification, part of the insulating member 40B fills an edge of at least one of the solid electrolyte layer 30, the active material layer 12, and the active material layer 22 that touches the side surface 4. Specifically, the active material layer 12, solid electrolyte layer 30, and active material layer 22 of the battery 102 generally have micron-size pores. That is, as shown in FIG. 4, pores are formed between particles 13 that constitute each layer. The pores between the particles 13 are filled with part of the insulating member 40B.

Normally, the porosity of each layer at an edge of the side surface 4 is higher than or equal to 10%. Filling these pores with part of the insulating member 40B brings about improvement in anchoring effect between the insulating member 40B and each layer, thus making it possible to further strengthen the integrity of the battery 102. This brings about structural stability and an effect of reducing the spread of defects even in the presence of microcracks or interlayer delamination in the side surface 4, as the insulating member 40B is cured for fixation.

Further, providing the wraparound portions 42B and 43B causes the bonding surfaces to more firmly anchored to each other, making it possible to reduce the formation of voids at the bonding interface, where voids tend to be formed by external stress such as bending stress. This makes it also possible to further enhance the reliability of an effect of blocking out moisture, gas, or other substances.

Such a microstructure in which pores are filled with part of the insulating member 40B is formed, for example, by applying liquid epoxy resin to the side surface 4, thermally curing the resin, and thereby curing the resin with open pores infiltrated with the resin under reduced pressure. It should be noted that such a microstructure infiltrated with the insulating member 40B can be observed by a common cross-section observation technique such as a cut cross-section, a ground cross-section, or ion milling. It should be noted that such a microstructure is not limited to the present modification but may be similar to those of the other modifications, Embodiment 1, and the other embodiments.

It should be noted that the filling of the active material layer 12 and the solid electrolyte layer 30 with part of the insulating member 40B may render the boundary between the insulating member 40B and the power generating element 1, i.e. the side surface 4, indefinite. In this case, as indicated by a dashed line in FIG. 4, the side surface 4 can be deemed as a surface that is flush with the edge face of the collector 11. Alternatively, the side surface 4 may be deemed as a plane connecting the edge face of the collector 11 with the edge face of the collector 21.

Further, in the present modification, the wraparound portion 42B is provided at one or more corners among four corners of the main surface 2. Specifically, as shown in (b) of FIG. 3, the wraparound portion 42B has corner portions 44a, 44b, 44c, and 44d covering four corners 6a, 6b, 6c, and 6d, respectively, of the main surface 2. It should be noted that the corners 6a, 6b, 6c, and 6d are each a point of connection between two adjacent ridge lines.

Each of the corner portions 44a, 44b, 44c, and 44d is a size larger than other portions. For example, the thickness and height of the corner portion 44a of the wraparound portion 42B are greater than the thickness and height of a central portion (specifically, a portion on line IIIa-IIIa of (b) of FIG. 3) of the ridge line 5a. Further, in a plan view, the edge of the corner portion 44a that is close to the center of the main surface 2 is curved concavely outward. The corner portions 44b, 44c, and 44d have similar shapes. That is, the inside contours of the wraparound portion 42B in plan view have the shape of a quadrangular having rounded corners.

It should be noted that the wraparound portion 42B is not limited to particular shapes. For example, the wraparound portion 42B may have only one of the corner portions 44a, 44b, 44c, and 44d. Further, the wraparound portion 42B and the wraparound portion 43B may be different in at least either shape or size from each other.

Modification 3

Next, Modification 3 of Embodiment 1 is described. The following describes Modification 3 with a focus on differences from Embodiment 1 and omits or simplifies a description of common features.

Figure 5:
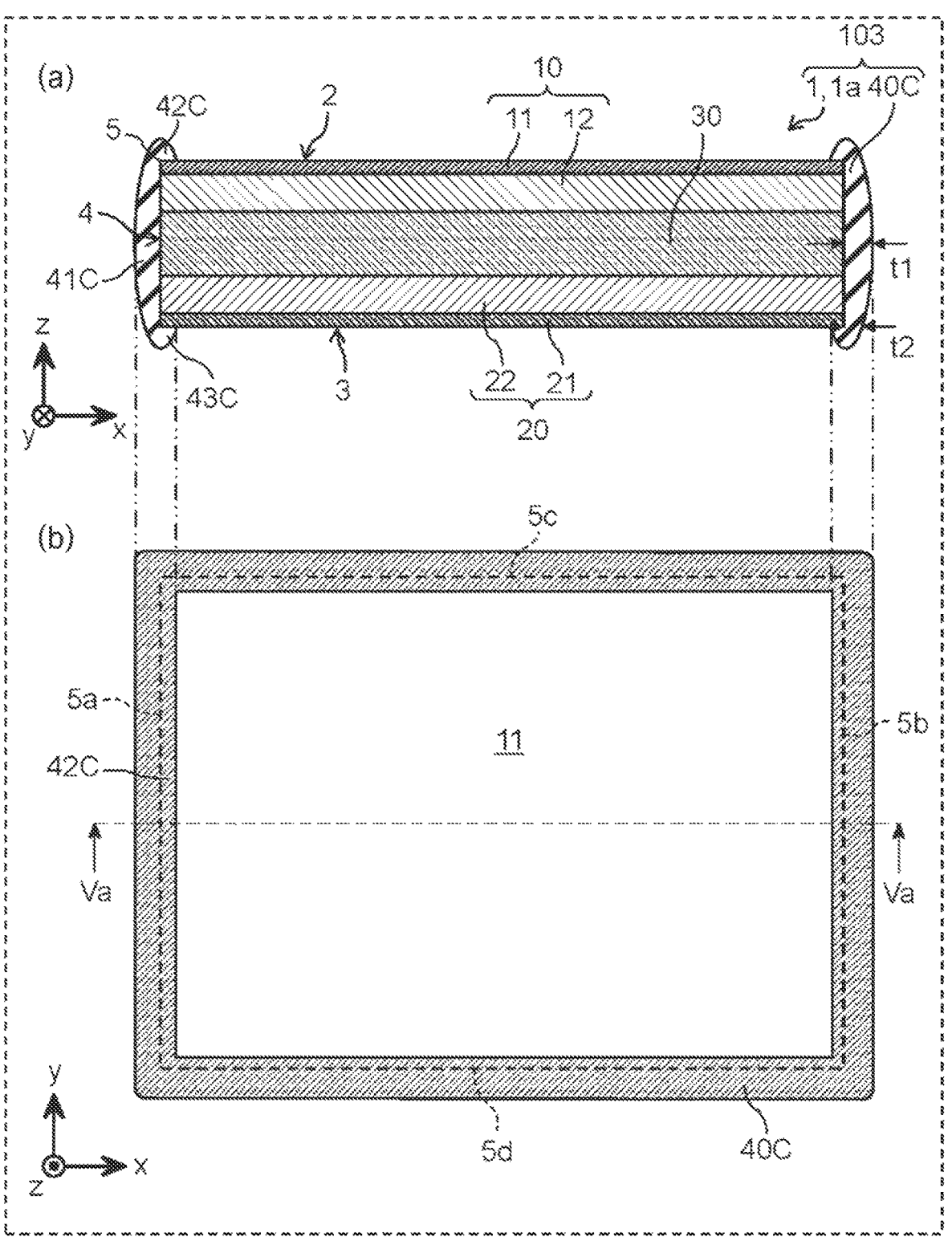
FIG. 5 illustrates a cross-sectional view and a plan view both schematically showing a configuration of a battery according to Modification 3 of Embodiment 1.

FIG. 5 is a diagram schematically showing a configuration of a battery 103 according to Modification 3 of Embodiment 1. Specifically, (a) of FIG. 5 is a cross-sectional view of the battery 103 according to the present modification, and (b) of FIG. 5 is a plan view of the battery 103 as seen from the positive side of the z-axis direction. (a) of FIG. 5 shows a cross-section as taken along line Va-Va in (b) of FIG. 5.

As shown in FIG. 5, the battery 103 according to the present modification differs from the battery 100 according to Embodiment 1 in that the battery 103 according to the present modification includes an insulating member 40C instead of the insulating member 40. The insulating member 40C includes a side wall portion 41C and wraparound portions 42C and 43C. It should be noted that the wraparound portion 43C is the same as the wraparound portion 42C except that the wraparound portion 43C covers the edges of the main surface 3, not the main surface 2. For this reason, the following gives a description with a focus on the wraparound portion 42C. Features of the wraparound portion 42C are also applicable to the wraparound portion 43C.

In the present modification, the thickness t1 of the side wall portion 41C is greater than the thickness t2 of the wraparound portion 42C. That is, the insulating member 40C is formed to be thicker toward the center and thinner toward an end in in a direction parallel with the thickness of the power generating element 1.

The battery 103 according to the present modification too makes it possible to firmly prevent an interelectrode short circuit, foreign-body contact, and corrosion and reaction of a collector. Furthermore, the wraparound portions 42C and 43C bring about a working effect of firmly integrating all layers of the power generating element 1 of even a large-sized and low-profile battery 103. This gives a high-energy-density and high-capacity highly-reliable battery 103.

Modification 4

Next, Modification 4 of Embodiment 1 is described. The following describes Modification 4 with a focus on differences from Embodiment 1 and omits or simplifies a description of common features.

Figure 6:
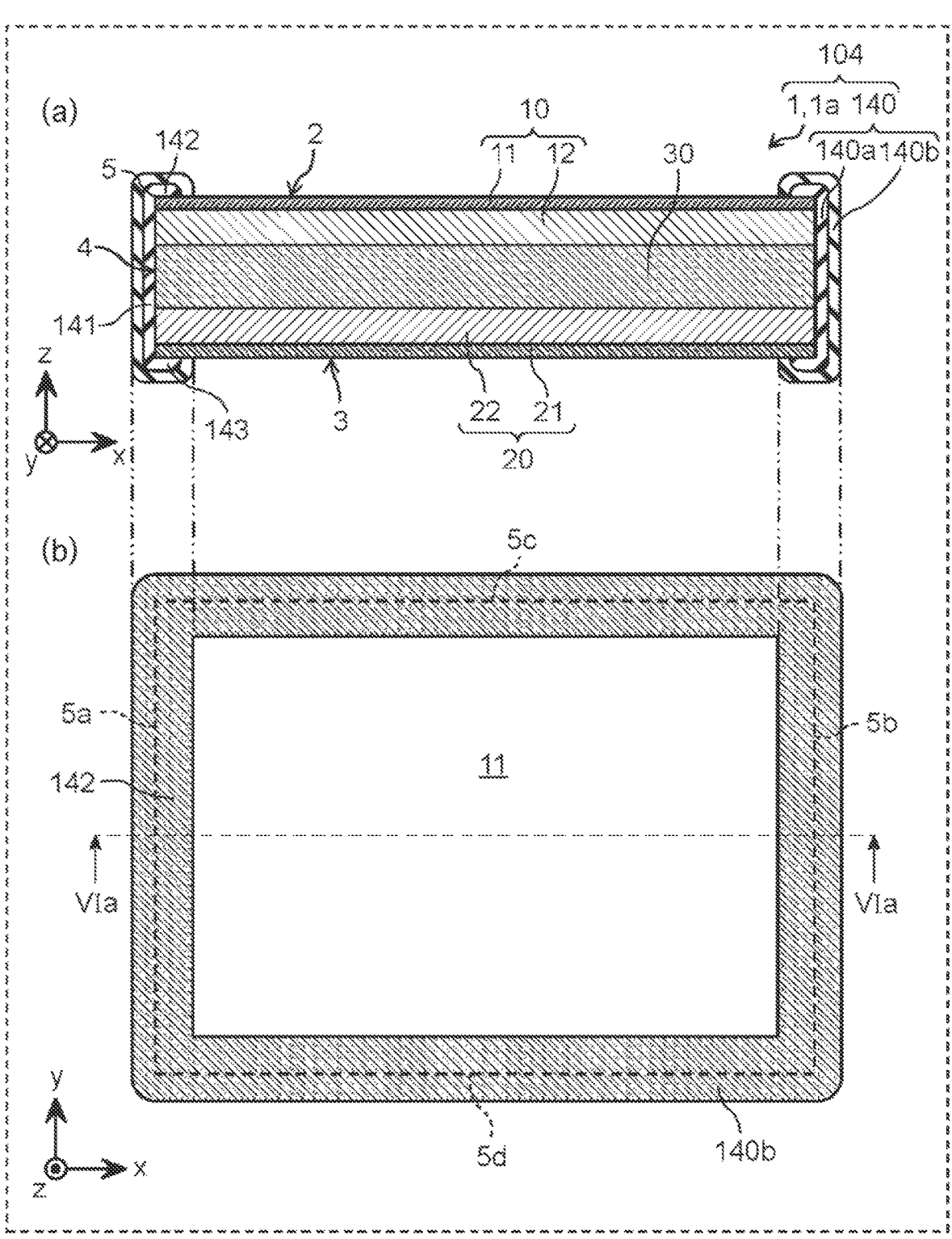
FIG. 6 illustrates a cross-sectional view and a plan view both schematically showing a configuration of a battery according to Modification 4 of Embodiment 1.

FIG. 6 is a diagram schematically showing a configuration of a battery 104 according to Modification 4 of Embodiment 1. Specifically, (a) of FIG. 6 is a cross-sectional view of the battery 104 according to the present modification, and (b) of FIG. 6 is a plan view of the battery 104 as seen from the positive side of the z-axis direction. (a) of FIG. 6 shows a cross-section as taken along line VIa-VIa in (b) of FIG. 6.

As shown in FIG. 6, the battery 104 according to the present modification differs from the battery 100 according to Embodiment 1 in that the battery 104 according to the present modification includes an insulating member 140 instead of the insulating member 40. The insulating member 140 has a laminating structure of a plurality of insulating films. Specifically, the insulating member 140 includes a first film 140*a* and a second film 140*b*.

The first film 140*a* is in touch with the side surface 4 of the power generating element 1. The first film 140*a* continuously extends from the main surface 2 via the side surface 4 to the main surface 3 and covers the main surface 2, the side surface 4, and the main surface 3 while having contact with the main surface 2, the side surface 4, and the main surface 3. That is, the first film 140*a* is included in a side wall portion 141 and wraparound portions 142 and 143 of the insulating member 140.

The second film 140*b* entirely covers a surface of the first film 140*a* that faces away from the side surface 4. The second film 140*b* is formed to be a size larger than the first film 140*a* so that the first film 140*a* is not exposed. Specifically, the second film 140*b* continuously extends from the main surface 2 via the side surface 4 to the main surface 3 and covers the main surface 2, the first film 140*a*, and the main surface 3 while having contact with the main surface 2, the first film 140*a*, and the main surface 3. That is, the second film 140*b* is included in the side wall portion 141 and wraparound portions 142 and 143 of the insulating member 140. In this way, the second film 140*b* can enhance the sealing properties of the insulating member 140 by completely covering the first film 140*a* from one edge to the other.

The first film 140*a* and the second film 140*b* contain resin materials different from each other. For example, the first film 140*a* and the second film 140*b* are different in hardness from each other. Specifically, the first film 140*a* is softer than the second film 140*b*. Further, the first film 140*a* is softer than the solid electrolyte layer 30 and the active material layers 12 and 22. Specifically, the first film 140*a* is softer than the solid electrolyte layer 30 and the active material layers 12 and 22 at a temperature lower than or equal to a lower limit of an operating temperature range of the battery 104. This makes it possible to bring about improvement especially in heat cycle resistance of the battery 104.

In general, when a thick insulating resin material is applied and cured, the resin material thus applied undesirably tends to delaminate under curing stress. To address this problem, the present modification makes it possible to easily thicken the insulating member 140 by laminating thin insulating films. For example, epoxy resin is repeatedly further applied and cured on top of cured thin epoxy resin having a thickness of approximately 10 μm to 50 μm. This fills the pores, brings about improvement in thickness unevenness by leveling, and makes it possible to form a dense, robust, and thick insulating member 140 without delamination. Specifically, an insulating member 140 having a thickness greater than or equal to 500 μm can be formed.

In this way, the thickness of the insulating member 140 is made greater by the laminating structure than in the case of a single-layer film. This makes it possible to reduce defects such as voids in a single-layer film. Further, since the thickness can be increased while the occurrence of cracking or delamination is reduced, a highly-reliable battery 104 can be obtained. Further, multi-layering of insulating films of different properties makes it possible to form an insulating member 140 having desired properties such as heat resistance, shock resistance, or airtightness.

In the present modification, the second film 140*b* is formed to completely cover the first film 140*a*, which serves as a foundation layer. By having such a laminating structure, the insulating member 140 also has improved passivation and can further prevent entry of outside air. Of course, the insulating member 140 can be formed even with a thickness of 1 mm. By a common observation of a ground cross-section with an optical microscope, a SEM (scanning electron microscope), or other microscopes, such an insulating member 140 of a laminating structure can be observed as a layer structure that is formed by repeating application and curing a large number of times.

For example, by laminating insulating materials by repeatedly applying and curing the materials in descending order of curing temperature or glass transition temperature, a dense and thick insulating member 140 can be formed without deterioration in properties of the foundation insulating layer by heat during curing. As conditions for thermal curing, the temperature or the time is set to such an extent that the characteristics of the battery 104 are not adversely affected.

In the present modification, the insulating layers of the insulating member 140 may be formed of the same material. Such an insulating member 140 can be formed more easily than in the case of a single-layer structure, has few defects, and is highly capable of protecting the side surface 4.

Further, the insulating member 140 may include three or more insulating films laminated. Further, in the present modification, the side wall portion 141 and the wraparound portions 142 and 143 may be different in number of laminated layers from one another or may be different in hardness from one another. For example, in improving the shock resistance of the battery 104 and the corrosion resistance and reaction resistance of the collectors, protection of the power generating element 1 and the side surface on which the edge faces of the collectors are exposed is effective as a matter of course. For this reason, improvement in shock resistance, corrosion resistance, and reaction resistance can be brought about by thickening the insulating member 140.

Embodiment 2

The following describes Embodiment 2. The following describes Embodiment 2 with a focus on differences from Embodiment 1 and omits or simplifies a description of common features.

Figure 7:
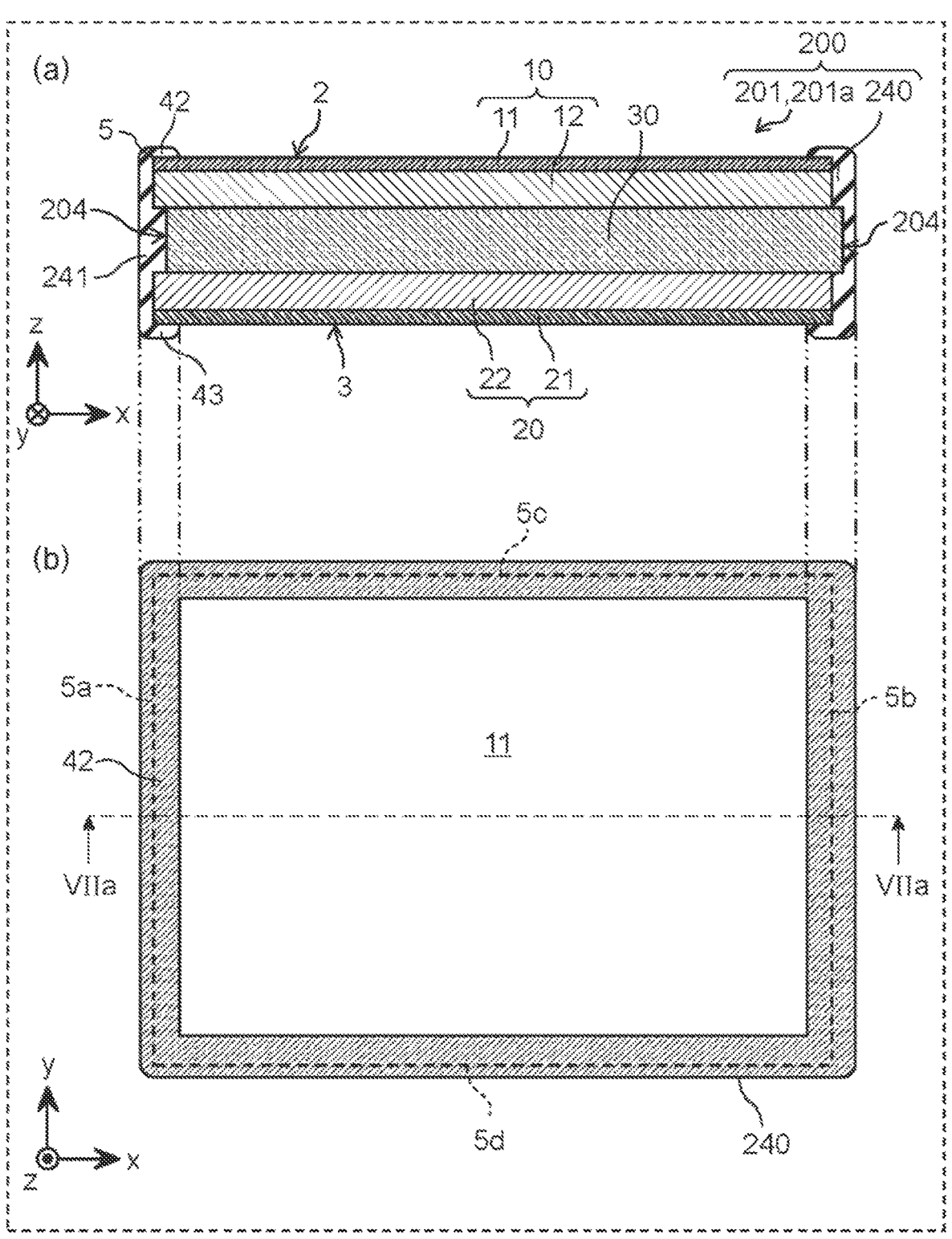
FIG. 7 illustrates a cross-sectional view and a plan view both schematically showing a configuration of a battery according to Embodiment 2.

FIG. 7 illustrates a cross-sectional view and a plan view both schematically showing a configuration of a battery 200 according to Embodiment 2. Specifically, (a) of FIG. 7 is a cross-sectional view of the battery 200 according to the present embodiment, and (b) of FIG. 7 is a plan view of the battery 200 as seen from the positive side of the z-axis direction. (a) of FIG. 7 shows a cross-section as taken along line VIIa-VIIa in (b) of FIG. 7.

As shown in FIG. 7, the battery 200 according to the present embodiment includes a power generating element 201 and an insulating member 240. The power generating element 201 has only one battery cell 201*a*. The battery cell 201*a* differs from the battery cell 1*a* of the battery 100 according to Embodiment 1 in that a side surface 204 has a step.

In the example shown in FIG. 7, the solid electrolyte layer 30 is placed out of alignment with the electrode layer 10 and the counter-electrode layer 20. Specifically, the solid electrolyte layer 30 is disposed to project toward the positive side of the x-axis direction from the electrode layer 10 and the counter-electrode layer 20. This causes the side surface 204 of the power generating element 201 to have a recessed step on the negative side of the x-axis direction and a raised step on the positive side of the x-axis direction.

In the present embodiment, the insulating member 240 covers the steps of the side surface 204. Specifically, the insulating member 240 has a side wall portion 241 varying in thickness depending on the steps of the side surface 204. For example, on the negative side of the x-axis direction, on which the recessed step is formed, the thickness of part of the side wall portion 241 along the solid electrolyte layer 30 is great, and the thicknesses of parts of the side wall portion 241 along the electrode layer 10 and the counter-electrode layer 20 are small. In contrast, on the positive side of the x-axis direction, on which the raised step is formed, the thickness of part of the side wall portion 241 along the solid electrolyte layer 30 is small, and the thicknesses of parts of the side wall portion 241 along the electrode layer 10 and the counter-electrode layer 20 are great.

Formation of a step in or on the side surface 204 makes it easy for gas such as atmospheric air, moisture, or other substances to enter through a gap between the side surface 204 and the insulating member 240. On the other hand, according to the present embodiment, the infiltration of the steps of the side surface 204 with the insulating member 240 brings about improvement in anchoring properties of the insulating member 240. That is, since entry of gas, moisture, or other substances can be blocked out, improvement in sealing properties of the power generating element 201 is brought about. For this reason, even in an environment in which atmospheric air or moisture is present, entry of these substances is prevented. This brings about improvement in environment resistance of the battery 200, and also brings about improvement in reliability against stress such as a heat cycle, shock, or repetition of charge and discharge. Furthermore, even in the event of a stress produced during curing of the insulating member 240, the steps bring about an effect of suppressing delamination of the insulating member 240. This brings about further improvement in anchoring reliability.

It should be noted that any one of the electrode layer 10, the solid electrolyte layer 30, and the counter-electrode layer 20 may be a layer that is provided with steps. Further, for example, the solid electrolyte layer 30 may be constituted as a laminating structure of two layers, and the two layers may be formed out of alignment with each other. Further, steps may be formed by displacing the active material layer 12 or 22 or the collector 11 or 21.

The steps thus provided bring about an effect of increasing the area of bonding of the side surface 204 and the insulating member 240, thus making it possible to increase the strength of anchoring between the power generating element 1 and the insulating member 240. Further, since a pathway of entry of gas, moisture, or other substance along the interface between the side surface 204 and the insulating member 240 is bent and the length of the pathway is extended, the capability to protect against gas and moisture can be enhanced.

For example, forming a step of a size comparable to the thickness of each layer is fully effective. For example, if the thickness of the solid electrolyte layer 30 is 30 μm, it is only necessary to provide a step having a size of approximately 30 μm. It should be noted that the size of a step is equivalent to an amount of protrusion or an amount of recess with the side surface 204 being deemed as a flat surface. For example, in the example shown in (a) of FIG. 7, the amount of protrusion and amount of recession of the solid electrolyte layer 30 are larger than or equal to several micrometers and smaller than or equal to several millimeters, but are not limited to particular amounts. It should be noted that an appropriate range is preferred, as an excessively large step causes a decrease in energy density or capacity of the battery 200.

Further, the size of each layer that constitutes the battery cell 201a may be different. For example, the size of the solid electrolyte layer 30 in plan view may be larger than the size of each of the electrode and counter-electrode layers 10 and 20 in plan view. This causes the solid electrolyte layer 30 to protrude from the electrode layer 10 and the counter-electrode layer 20, whereby a raised step is formed on the side surface 204. Alternatively, the size of the solid electrolyte layer 30 in plan view may be smaller than the size of each of the electrode and counter-electrode layers 10 and 20 in plan view. This causes the solid electrolyte layer 30 to be further back than the electrode layer 10 and the counter-electrode layer 20, whereby a recessed step is formed in the side surface 204.

Embodiment 3

The following describes Embodiment 3. The following describes Embodiment 3 with a focus on differences from Embodiment 1 and omits or simplifies a description of common features.

Figure 8:
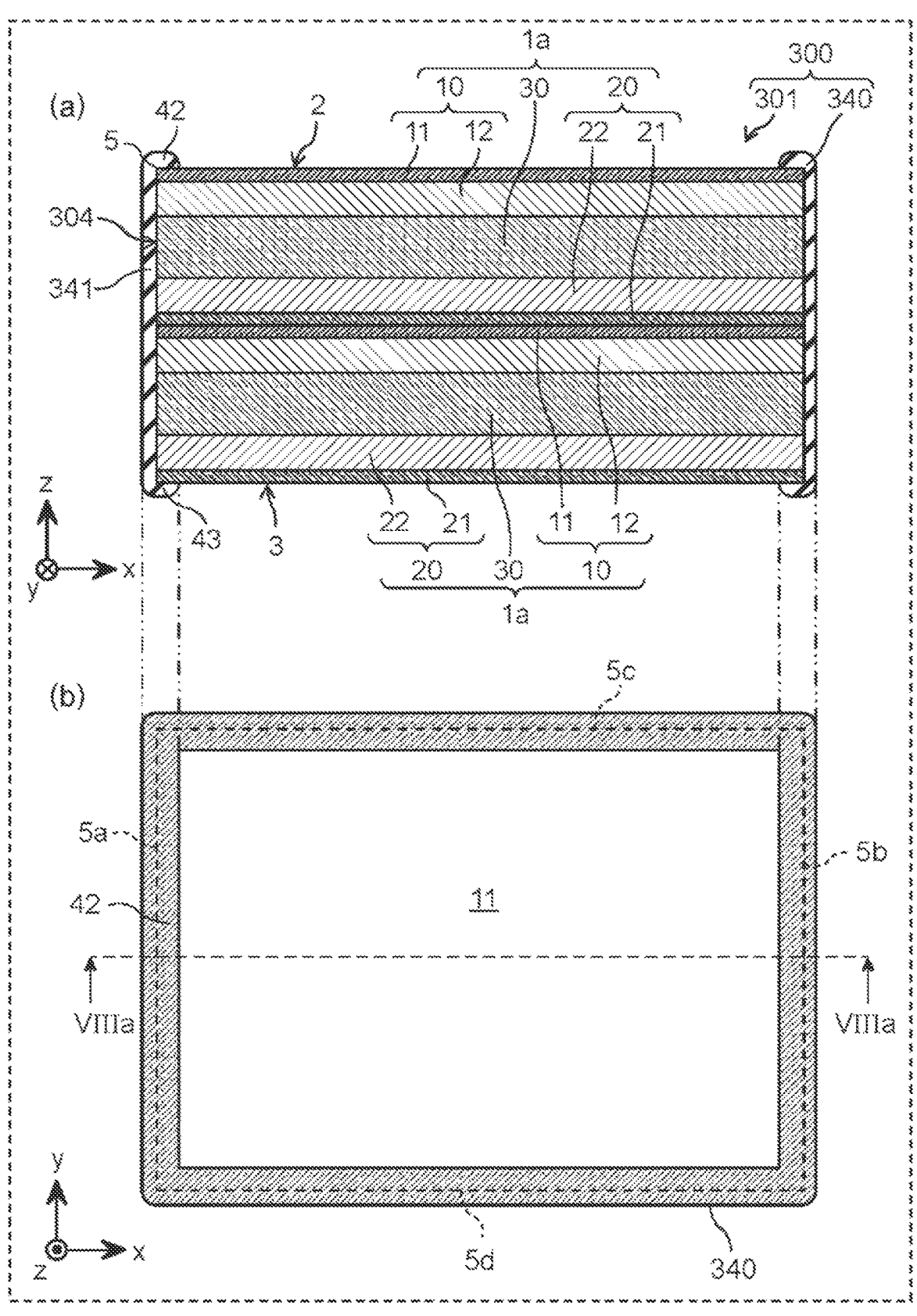
FIG. 8 illustrates a cross-sectional view and a plan view both schematically showing a configuration of a battery according to Embodiment 3.

FIG. 8 is a diagram schematically showing a configuration of a battery 300 according to Embodiment 3. Specifically, (a) of FIG. 8 is a cross-sectional view of the battery 300 according to the present embodiment, and (b) of FIG. 8 is a plan view of the battery 300 as seen from the positive side of the z-axis direction. (a) of FIG. 8 shows a cross-section as taken along line VIIIa-VIIIa in (b) of FIG. 8.

As shown in FIG. 8, the battery 300 includes a power generating element 301 and an insulating member 340. The power generating element 301 has a structure in which two of those battery cells 1a show in FIG. 1 are laminated in the z-axis direction. The two battery cells 1a are electrically connected in series. In the present embodiment, the positive electrode of one of the battery cells 1a and the negative electrode of the other of the battery cells 1a are directly connected to each other. The collectors 11 and 21 thus connected form a so-called bipolar electrode, for example, in which one of the collectors 11 and 21 serves as a positive electrode and the other of the collectors 11 and 21 serves as a negative electrode.

The insulating member 340 covers a side surface 304 of the power generating element 301 while having contact with the side surface 304. The side surface 304 of the power generating element 301 is a side surface of each of the two battery cells 1a. The insulating member 340 has a side wall portion 341 collectively and continuously covering the side surfaces of the two battery cells 1a.

In this way, the battery 300 according to the present embodiment, in which a plurality of battery cells 1a are laminated, makes it possible to achieve improvement in energy density and an increase in capacity.

It should be noted that the two battery cells 1a may be electrically connected in parallel. Further, the power generating element 301 may include three or more battery cells 1a. The three or more battery cells 1a may be connected in parallel or may be connected in series. Further, electrical connections among the three or more battery cells 1*a* may be a combination of a parallel connection and a serial connection.

Further, in the present embodiment, the insulating member 340 may be equivalent in configuration to that of the insulating members 40A, 40B, 40C, and 140 shown in Modifications 1 to 4 of Embodiment 1.

Modification 1

Next, Modification 1 of Embodiment 3 is described. The following describes Modification 1 with a focus on differences from Embodiment 3 and omits or simplifies a description of common features.

Figure 9:
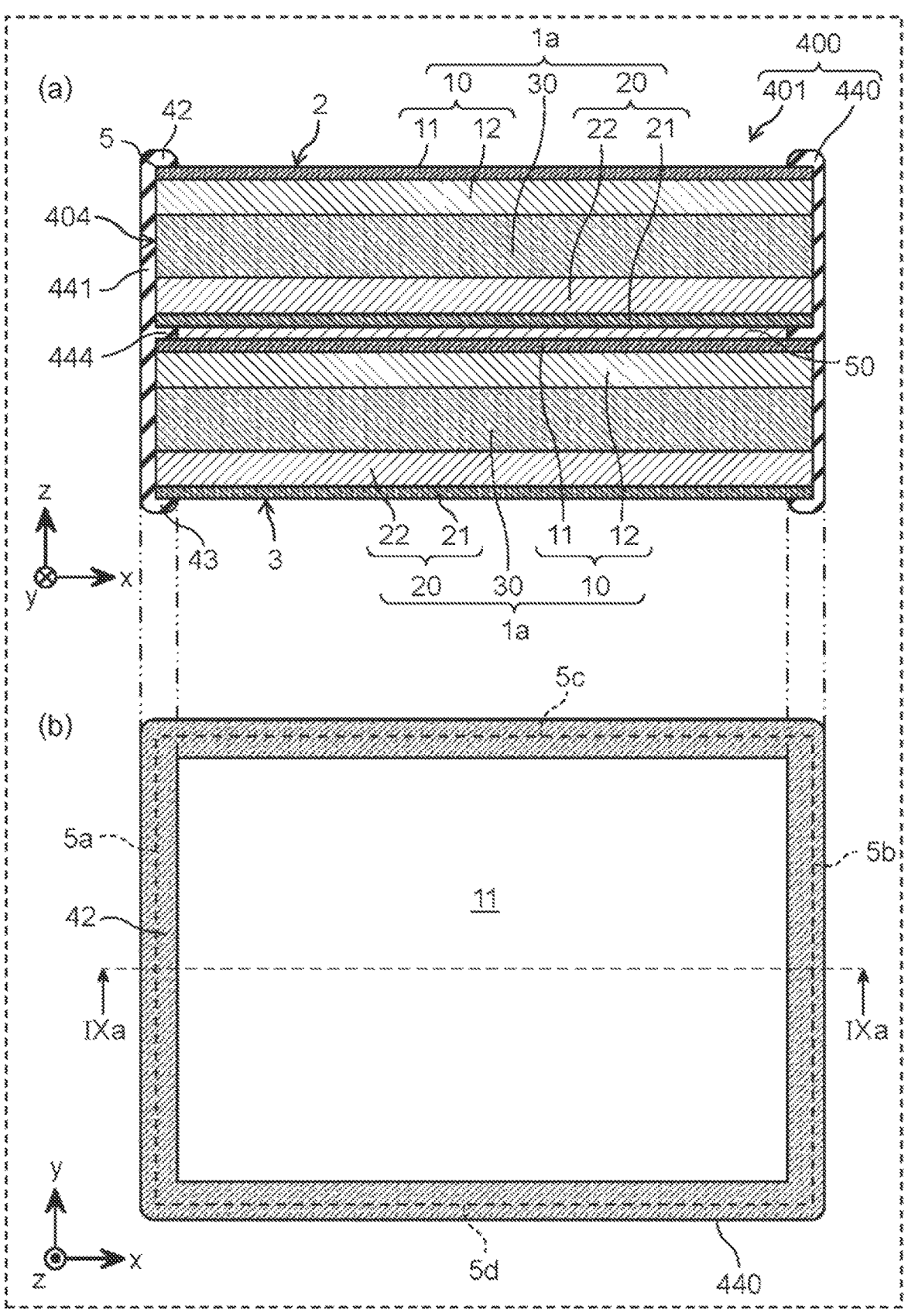
FIG. 9 illustrates a cross-sectional view and a plan view both schematically showing a configuration of a battery according to Modification 1 of Embodiment 3.

FIG. 9 is a diagram schematically showing a configuration of a battery 400 according to Modification 1 of Embodiment 3. Specifically, (a) of FIG. 9 is a cross-sectional view of the battery 400 according to the present modification, and (b) of FIG. 9 is a plan view of the battery 400 as seen from the positive side of the z-axis direction. (a) of FIG. 9 shows a cross-section as taken along line IX-IX in (b) of FIG. 9.

As shown in FIG. 9, the battery 400 according to the present modification includes a power generating element 401 and an insulating member 440. As compared with the power generating element 301 according to Embodiment 3, the power generating element 401 further includes a conductive adhesive layer 50.

The conductive adhesive layer 50 is located between two battery cells 1*a*, and is provided in contact with each of the two battery cells 1*a*. Specifically, the conductive adhesive layer 50 is provided in contact with the collector 21 of one of the battery cells 1*a* and the collector 11 of the other of the battery cells 1*a*.

In a plan view, the conductive adhesive layer 50 is smaller than the collectors 11 and 21. For this reason, a gap extending along the edge faces of the conductive adhesive layer 50 is provided between the collector 11 and the collector 21. That is, a step is formed in a side surface 404 of the power generating element 401. In the present modification, the step is filled with the insulating member 440.

As shown in (a) of FIG. 9, the insulating member 440 includes a filling portion 444. The filling portion 444 is a portion extending inward from the inside of a side wall portion 441 so as to fill the gap between the battery cells 1*a*, i.e. the step in the side surface 404.

Further, in the present modification, forming the conductive adhesive layer 50 so that the conductive adhesive layer 50 is smaller than the collectors 11 and 21 makes it possible to prevent the conductive adhesive layer 50 from being extruded onto the side surfaces of the battery cells 1*a*. This makes it possible to prevent a short circuit between the battery cells 1*a*.

Further, although a gap is formed between the battery cells 1*a* because the conductive adhesive layer 50 is small, the step can be filled with the filling portion 444 of the insulating member 440. This brings about an effect of allowing the insulating member 440 to form a firm anchor between the battery cells 1*a*, making it possible to achieve high shock resistance.

Modification 2

Next, Modification 2 of Embodiment 3 is described. The following describes Modification 2 with a focus on differences from Modification 1 of Embodiment 3 and omits or simplifies a description of common features.

Figure 10:
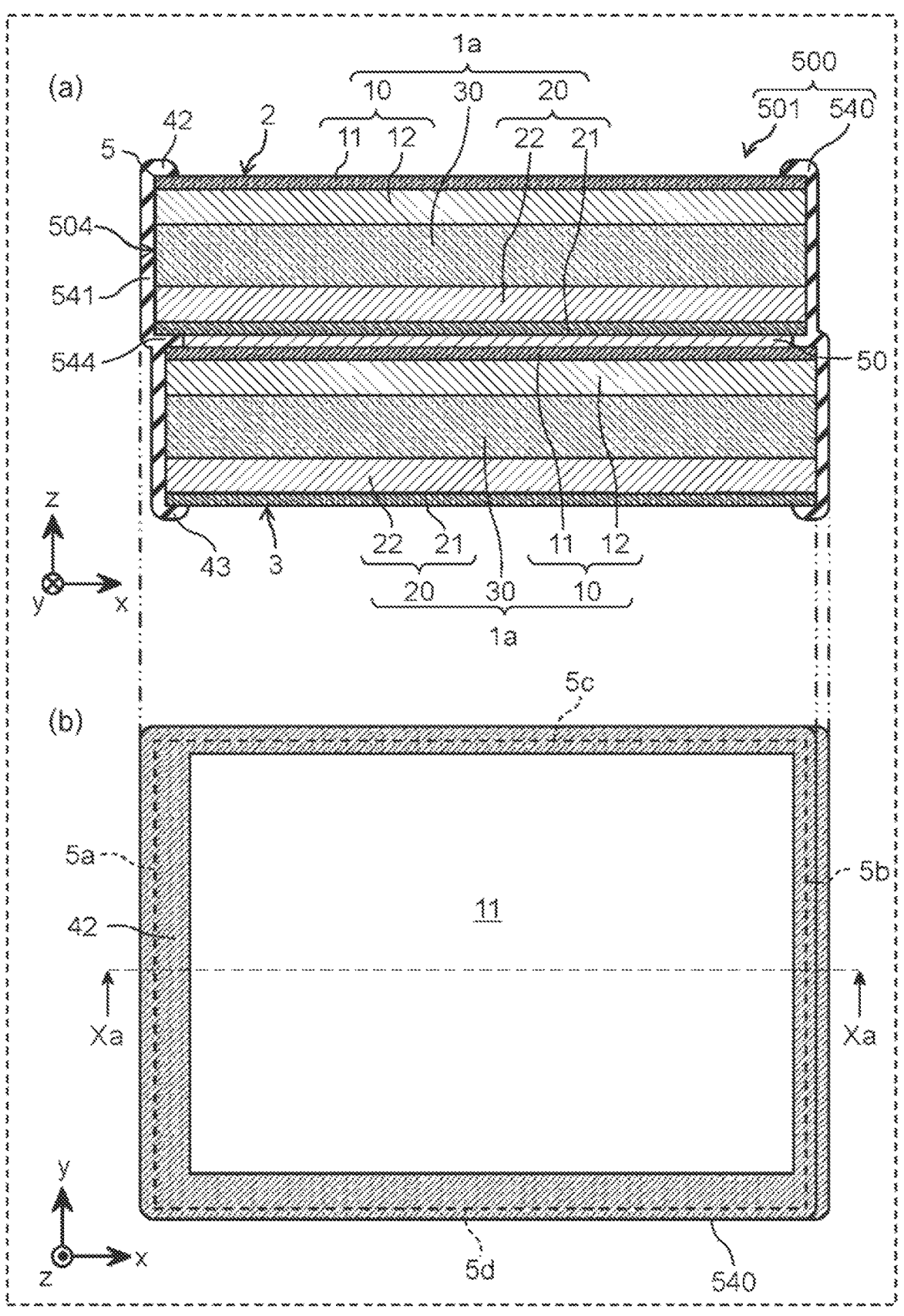
FIG. 10 illustrates a cross-sectional view and a plan view both schematically showing a configuration of a battery according to Modification 2 of Embodiment 3.

FIG. 10 is a diagram schematically showing a configuration of a battery 500 according to Modification 2 of Embodiment 3. Specifically, (a) of FIG. 10 is a cross-sectional view of the battery 500 according to the present modification, and (b) of FIG. 10 is a plan view of the battery 500 as seen from the positive side of the z-axis direction. (a) of FIG. 10 shows a cross-section as taken along line Xa-Xa in (b) of FIG. 10.

As shown in FIG. 10, the battery 500 includes a power generating element 501 and an insulating member 540. The power generating element 501 differs from the power generating element 401 according to Modification 1 in that the two battery cells 1*a* are laminated out of alignment from each other. This causes a step to be formed in or on a side surface 504 of the power generating element 501.

The insulating member 540 is provided so as to cover the side surface 504 of the power generating element 501, and covers the step. In the present modification, the insulating member 540 has a side wall portion 541 formed with a uniform thickness. That is, an outer surface of the side wall portion 541 is formed along the step of the side surface 504 of the power generating element 501, and has a step. Further, as in the case of Modification 1, the insulating member 540 includes a filling portion 544 filling the gap between the battery cells 1*a*.

By thus laminating the battery cells 1*a* out of alignment from each other and providing the insulating member 540 so as to cover the step thus formed, improvement in anchoring properties of the insulating member 540 is brought about. For this reason, even in an environment in which atmospheric air or moisture is present, entry of these substances is prevented. This brings about improvement in environment resistance of the battery 500, and also brings about improvement in reliability against stress such as a heat cycle, shock, or repetition of charge and discharge. Furthermore, even in the event of a stress produced during curing of the insulating member 540, the step brings about an effect of suppressing delamination of the insulating member 540. This brings about further improvement in anchoring reliability.

It should be noted that any one of the battery cells 1*a* may be a battery cell that is laminated out of alignment. Further, a plurality of battery cells 1*a* may be laminated collectively out of alignment.

Further, a similar effect is brought about by providing an outer peripheral side surface with a step, for example, by making a difference in size between upper and lower parts of the battery or the power generating element.

Further, the battery cells 1*a* may be different in size from each other. For example, the size of a first battery cell 1*a* in plan view may be larger than the size of a second battery cell 1*a* in plan view. This causes the first battery cell 1*a* to protrude from the second battery cell 1*a*, whereby a raised step is formed on the side surface 504. Alternatively, the size of the first battery cell 1*a* in plan view may be smaller than the size of the second battery cell 1*a* in plan view. This causes the first battery cell 1*a* to be further back than the second battery cell 1*a*, whereby a recessed step is formed in the side surface 504.

Method for Manufacturing Battery

Next, an example of a method for manufacturing a battery according to any of the aforementioned embodiments and modifications is described. The following describes a method for manufacturing a battery 100 according to Embodiment 1 shown in FIG. 1 described above.

First, a method for manufacturing a battery cell 1*a* is described.

First, pastes are prepared for use in the formation of an active material layers 12 (specifically a positive-electrode active material layer) and an active material layer 22 (specifically a negative-electrode active material layer) by printing. As a solid electrolyte raw material for use in a compound of each of the positive-electrode and negative-electrode active material layers, for example, a glass powder of a $Li_2S$—$P_2S_5$ sulfide composed primarily of a triclinic crystal is prepared with an average particle diameter of approximately 10 μm. A usable example of this glass powder has a high ion conductivity higher than or equal to $2\times10^{-3}$ S/cm and lower than or equal to $3\times10^{-3}$ S/cm. As a positive-electrode active material, for example, a powder of a lamel-larly-structured Li·Ni·Co·Al complex oxide ($LiNi_{0.8}Co_{0.15}Al_{0.05}O_2$) with an average particle diameter of approximately 5 μm is used. A paste for use as the positive-electrode active material layer is prepared by dispersing, in an organic solvent or other substances, a compound containing the aforementioned positive-electrode active material and the aforementioned glass powder. Further, as a negative-electrode active material, for example, a powder of natural graphite with an average particle diameter of approximately 10 μm is used. A paste for use as the negative-electrode active material layer is similarly prepared by dispersing, in an organic solvent or other substances, a compound containing the aforementioned negative-elec-trode active material and the aforementioned glass powder.

Next, as materials for use as a collector 11 (specifically a positive-electrode collector) and a collector 21 (specifically a negative-electrode collector), for example, sheets of cop-per foil with a thickness of approximately 15 μm are prepared. The paste for use as the positive-electrode active material layer and the paste for use as the negative-electrode active material layer are printed by a screen printing method into predetermined shapes with thicknesses greater than or equal to approximately 50 μm and smaller than or equal to approximately 100 μm separately on one surface of each of the sheets of copper foil. The paste for use as the positive-electrode active material layer and the paste for use as the negative-electrode active material layer attain thicknesses greater than or equal to 30 μm and smaller than or equal to 60 μm by being dried in a temperature range of 80° C. to 130° C. This gives collectors (sheets of copper foil) on which the positive-electrode active material layer and the negative-electrode active material layer are formed, respec-tively, i.e. an electrode layer 10 (specifically a positive electrode) and a counter-electrode layer 20 (specifically a negative electrode).

Next, a paste for use as a solid electrolyte layer is prepared by dispersing, in an organic solvent or other substances, a compound containing the aforementioned glass powder. The aforementioned paste for use as the solid electrolyte layer is printed through a metal mask with a thickness of, for example, approximately 100 μm on a surface of each of the positive-electrode and negative-electrode active material layers. After that, the positive and negative electrodes on which the paste for use as the solid electrolyte layer has been printed are dried in a temperature range of 80° C. to 130° C.

Next, the solid electrolyte printed on the positive-elec-trode active material layer of the positive electrode and the solid electrolyte printed on the negative-electrode active material layer of the negative electrode are laminated in such a manner as to touch and face each other.

Next, an elastic sheet with a modulus of elasticity of $5\times10^6$ Pa is inserted between a press die plate and a collector upper surface. The thickness of the elastic sheet is for example 70 μm. After that, the press die plate is pressurized for 90 seconds while being heated to 50° C. under a pressure of 300 MPa.

Through these steps, a battery cell 1a is manufactured.

In a case where a plurality of battery cells 1a are lami-nated, a thermosetting conductor paste containing silver particles is screen-printed with a thickness of approximately 30 μm on a surface of a collector of the battery cells 1a to be bonded, and another battery is placed in a predetermined position and subjected to pressure bonding. After that, the intermediate product is left at rest under a pressure of, for example, approximately 1 kg/cm², subjected to 60 minutes of thermal curing at a temperature higher than or equal to approximately 100° C. and lower than or equal to approxi-mately 300° C., and cooled to room temperature. This makes it possible to form a power generating element 301, 401, or 501 including a plurality of battery cells 1a.

Next, a method for forming the insulating member 40 is described. The insulating member 40 can be formed, for example, by the edge-coating method, which is one of the edge-face electrode forming methods applied to chip com-ponents typified by MLCCs (multilayer ceramic capacitors). The following describes a specific example of the edge-face coating method with reference to FIG. 11.

Figure 11:
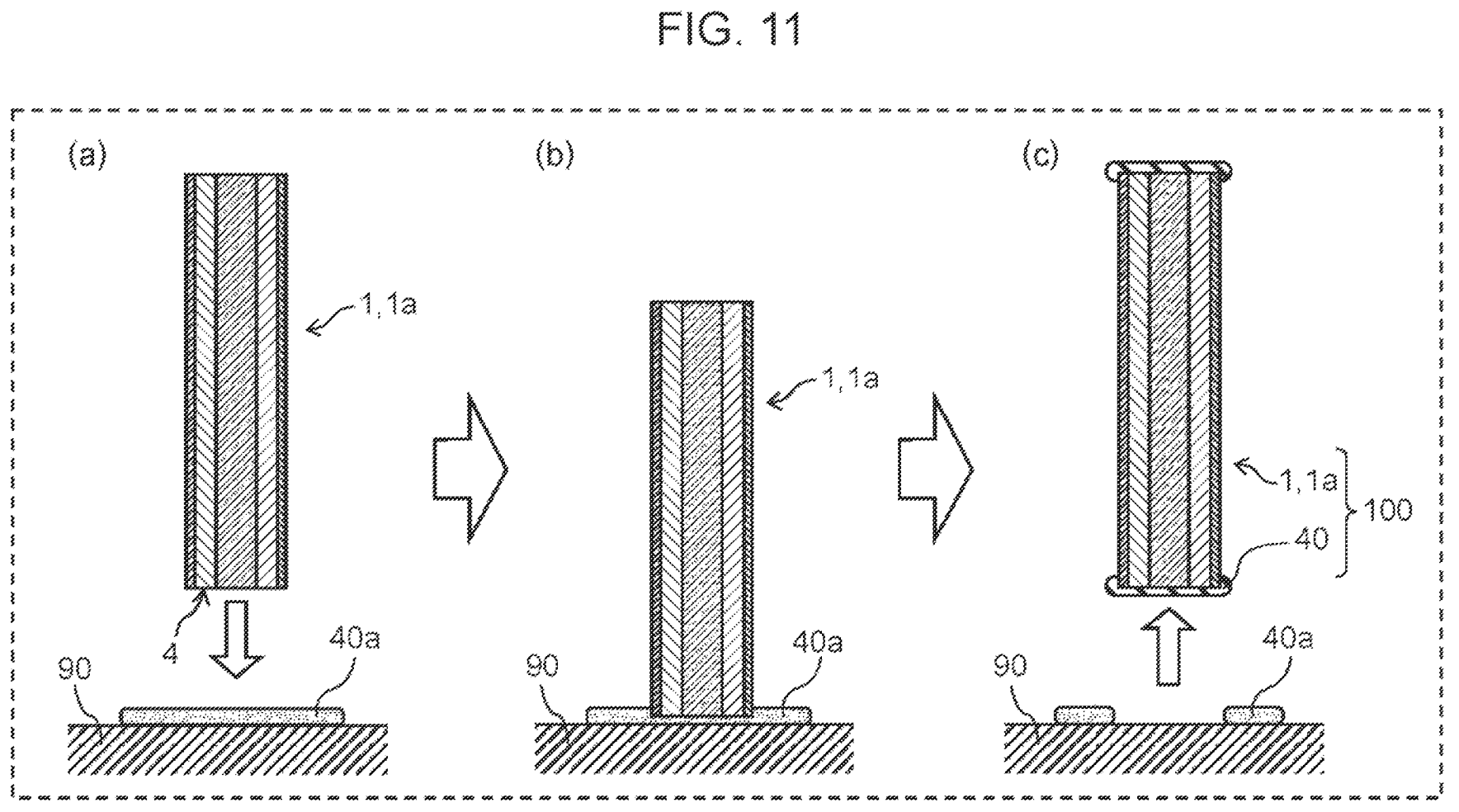

FIG. 11 is a cross-sectional view for explaining a method for manufacturing a battery according to an embodiment. Specifically, FIG. 11 shows an example of a method for forming an insulating member 40 on a power generating element 1.

As shown in (s) of FIG. 11, a resin material 40a is placed in the form of a thin film on top of a predetermined flat plate 90. The flat plate 90 is for example a metal plate. The resin material 40a is a material from which the insulating member 40 is made, and is for example an epoxy liquid.

As shown in (b) of FIG. 11, the side surface 4 of the power generating element 1 is immersed in the resin material 40a. Specifically, the side surface 4 of the power generating element 1 is pressed against the resin material 40a. As a result, as shown in (c) of FIG. 11, the resin material 40a adheres to the side surface 4 of the power generating element 1. The power generating element 1 is rotated so that the resin material 40a adheres entirely to the side surface 4. The resin material 40a adhering to the side surface 4 is cured to form the insulating member 40.

It should be noted that the state of coating with the resin material 40a varies depending on the viscosity of the resin material 40a, the wettability of the side surface 4 and main surfaces 2 and 3 of the power generating element 1, or other conditions. For this reason, the viscosity of the resin material 40a used and the conditions of the side surface 4 and main surfaces 2 and 3 of the power generating element 1 may be adjusted. For example, forming appropriate asperities on the side surface 4 and the main surfaces 2 and 3 disperses surface energy for higher wettability, making it possible to favorably control the shape of coating with the resin material 40a.

For example, a surface having a surface roughness Rz of approximately 0.5 μm with fine asperities can be formed simply by grinding a chamfered surface with a 10000 grit abrasive paper. Meanwhile, at this point in time, the edge faces of the collectors 11 and 21 are ground too, so that metal surfaces without adsorption components become exposed. Although this makes it easy for the edge faces to repel the resin material 40a, forming a bonding surface with fine asperities in advance causes the resin material 40a to be repelled less, making it possible to easily apply the resin material 40a. This makes it possible to apply the resin material 40a to a predetermined region of application with high accuracy. Furthermore, the effect of an increase in area of bonding caused by surface roughness further reinforces the anchoring effect of the insulating member 40, thus also bringing about an effect of improving the strength of bond-ing between the insulating member 40 and the power generating element 1.

For example, by forming fine asperities along the edges of the main surfaces 2 and 3, an insulating member 40A having a wraparound portion 42A such as that shown in FIG. 2 can be formed. Further, a common edge-face coating method causes increases in thickness of the wraparound portion 42B and the corner portions 44a, 44b, 44c, and 44d as in the case of the insulating member 40B shown in FIG. 3. By removing the thick portions, for example, by grinding, an insulating member 40 of uniform film thickness as shown in FIG. 1 can be formed.

Further, the insulating member 40 can also be formed by applying and thermally curing an epoxy power instead of the epoxy liquid. Of course, the side wall portion 41 and the wraparound portions 42 and 43 may each be formed separately from one another.

Through these steps, a battery 100 can be manufactured.

It should be noted that the method and procedure for forming a battery are not limited to the aforementioned examples.

For example, an insulating resin material may be applied to the side surface 4 of the power generating element 1 by screen printing. By curing the resin material applied by screen printing, the insulating member 40C shown in FIG. 5 can be formed.

Further, for example, in the case of a power generating element 301, 401, or 501 including a plurality of battery cells 1a, it is only necessary to apply an insulating material to the side surface 4 after having laminated the plurality of battery cells 1a. Alternatively, it is also possible to apply an insulating material to each battery cell 1a and then laminate the plurality of battery cells 1a to which the insulating material has been applied.

Although the aforementioned manufacturing method has illustrated an example in which the paste for use as the positive-electrode active material layer, the paste for use as the negative-electrode active material layer, the paste for use as the solid electrolyte layer, and the conductor paste are applied by printing, this is not intended to impose any limitation. Usable examples of printing methods include a doctor blade method, a calender method, a spin coat method, a dip coat method, an inkjet method, an offset method, a die coat method, and a spray method.

Although the foregoing manufacturing method has taken, as an example of the conductor paste, a thermosetting conductor paste containing metal particles of silver, this is not intended to impose any limitation. Further, a resin for use in the thermosetting conductor paste needs only be one that functions as a binding binder and, furthermore, an appropriate one, such as a printable or coatable resin, selected according to the manufacturing process adopted. Examples of the resin for use in the thermosetting conductor paste include thermosetting resins. Examples of thermosetting resins include (i) amino resins such as urea resins, melamine resins, and guanamine resins, (ii) epoxy resins such as bisphenol A, bisphenol F, novolac phenolic resins, and alicyclic resins, (iii) oxetane resins, (iv) phenol resins such as resol resins and novolak resins, and (v) silicone denatured organic resins such as silicone epoxy and silicone polyester. As the resin, only one of these materials may be used, or a combination of two or more of these materials may be used.

OTHER EMBODIMENTS

In the foregoing, a battery and a laminated battery according to the present disclosure have been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

For example, although an embodiment described above has illustrated an example in which the wraparound portion 42 provided over an area from the side surface 4 to the main surface 2 and the wraparound portion 43 provided over an area from the side surface 4 to the main surface 3 are identical in shape and size to each other, this is not intended to impose any limitation. The wraparound portion 42 and the wraparound portion 43 may be different in shape and size from each other. For example, the insulating member of a battery may include one selected from among the wraparound portions 42, 42A, 42B, 42C, and 142 and one selected from among the wraparound portions 43, 43A, 43B, 43C, and 143.

Further, for example, in each of the embodiments and modifications, the side wall portion and the wraparound portion may be different in hardness from each other. For example, the side wall portion and the wraparound portion may be formed of different materials.

Further, for example, the insulating member does not need to entirely cover the side surface 4 of the power generating element 1, and part of the side surface 4 may be exposed. The reliability of the battery can be made higher than in a case where no insulating member is provided at all. Further, although a wraparound portion is provided in the shape of a ring along the whole circumference of the main surface 2 or 3, the wraparound portion does not need to be provided in a portion of the circumference. For example, the wraparound portion may be intermittently provided along the circumference of the main surface 2 or 3. The reliability of the battery can be made higher than in a case where no wraparound portion is provided at all.

Further, for example, the insulating member does not need to contain resin. For example, the insulating member may be formed of an insulating inorganic material.

Further, for example, at least one of the electrode layer and the counter-electrode layer does not need to include a collector. For example, in a case where a plurality of electrode cells are laminated, the electrode layer or counter-electrode layer of one of adjacent electrode cells does not need to include a collector. For example, active material layers may be provided on both surfaces of one collector so that one collector can be shared by two electrode cells.

Further, for example, the outer surface of the wraparound portion does not need to be rounded. The outer surface of the wraparound portion may include a plane parallel to the main surface 2 and a plate parallel to the side surface 4, and these two planes may be connected at a right angle.

Further, the foregoing embodiments are subject, for example, to various changes, substitutions, additions, and omissions in the scope of the claims or the scope of equivalents thereof.

A battery and a laminated battery according to the present disclosure may be used as secondary batteries such as all-solid batteries for use, for example, in various types of electronics, automobiles, or other devices.

What is claimed is:

1. A battery, comprising:
a power generating element including at least one battery cell, the at least one battery cell including a positive electrode, a negative electrode, and a solid electrolyte layer; and
an insulating member covering a side surface of the power generating element and contacting the side surface,
wherein the insulating member includes a wraparound portion continuously extending over an area from the side surface to a main surface of the power generating element, covering the side surface and the main surface, and contacting the side surface and the main surface, and
the wraparound portion has a shape curved convexly toward a center of the main surface in a plan view of the main surface.

2. The battery according to claim 1, wherein an outer surface of the wraparound portion is rounded.

3. The battery according to claim 1, wherein
the insulating member includes a side wall portion covering a center of the side surface and with contacting the center, and
a first thickness of the wraparound portion is greater than a second thickness of the side wall portion.

4. The battery according to claim 1, wherein
the insulating member includes a side wall portion covering a center of the side surface and contacting the center, and
a first thickness of the side wall portion is greater than a second thickness of the wraparound portion.

5. The battery according to claim 1, wherein the wraparound portion is provided at one or more corners among four corners of the main surface.

6. The battery according to claim 1, wherein the side surface includes a step.

7. The battery according to claim 1, wherein
at least one of the positive electrode or the negative electrode includes a collector and an active material layer located between the collector and the solid electrolyte layer, and
the main surface is a first surface of the collector that faces away from a second surface of the collector on which the solid electrolyte layer is provided.

8. The battery according to claim 7, wherein the insulating member is softer than the solid electrolyte layer and the active material layer.

9. The battery according to claim 7, wherein the insulating member fills an edge of at least one of the solid electrolyte layer or the active material layer that touches the side surface.

10. The battery according to claim 1, wherein the insulating member contains resin.

11. The battery according to claim 10, wherein the insulating member includes a laminating structure of a plurality of insulating films.

12. The battery according to claim 11, wherein each of the plurality of insulating films contains a different resin material.

13. The battery according to claim 11, wherein each of the plurality of insulating layers is different in hardness.

14. The battery according to claim 11, wherein
the plurality of insulating layers includes a first film touching the side surface, and
the first film is softer than the solid electrolyte layer.

15. The battery according to claim 14, wherein the first film is softer than the solid electrolyte layer at a temperature lower than or equal to a lower limit of an operating temperature range of the battery.

16. The battery according to claim 11, wherein the plurality of insulating films includes a first film touching the side surface and a second film entirely covering a surface of the first film that faces away from the side surface.

17. The battery according to claim 1, wherein
the at least one battery cell comprises a plurality of battery cells, and
the plurality of battery cells is laminated.

18. The battery according to claim 1, wherein the solid electrolyte layer contains a solid electrolyte having lithium-ion conductivity.

19. A method for manufacturing the battery according to claim 1, the method comprising:
immersing, in an insulating material, the side surface of the power generating element.

20. A battery, comprising:
a power generating element including at least one battery cell, the at least one battery cell including a positive electrode, a negative electrode, and a solid electrolyte layer; and
an insulating member covering a side surface of the power generating element and contacting the side surface,
wherein the insulating member includes a wraparound portion continuously extending over an area from the side surface to a main surface of the power generating element, covering the side surface and the main surface, and contacting the side surface and the main surface,
the insulating member contains resin, and
the insulating member includes a laminating structure of a plurality of insulating films.

*     *     *     *     *